United States Patent
Taguchi et al.

(10) Patent No.: US 7,002,889 B2
(45) Date of Patent: Feb. 21, 2006

(54) DATA REPRODUCTION METHOD AND APPARATUS

(75) Inventors: Masakazu Taguchi, Kawasaki (JP); Toru Fujiwara, Kato (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 09/764,009

(22) Filed: Jan. 17, 2001

(65) Prior Publication Data
US 2001/0021153 A1    Sep. 13, 2001

(30) Foreign Application Priority Data
Mar. 13, 2000  (JP)  .............................. 2000-069012

(51) Int. Cl.
G11B 7/00    (2006.01)
G11B 5/76    (2006.01)

(52) U.S. Cl. ................................ 369/59.22; 369/59.21; 369/59.23; 369/124.13

(58) Field of Classification Search ............. 369/59.22, 369/59.13, 59.1, 47.1, 59.16, 59.21, 59.23, 369/47.35, 124.05, 124.13; 341/59, 106; 360/65, 46, 53, 48, 39, 40; 375/341, 232, 375/262, 229, 290; 714/701, 746, 795
See application file for complete search history.

(56) References Cited

U.S. PATENT DOCUMENTS

| | | | | | |
|---|---|---|---|---|---|
| 4,609,907 | A | * | 9/1986 | Adler et al. | 341/59 |
| 5,602,858 | A | * | 2/1997 | Kitaori | 714/795 |
| 5,737,142 | A | * | 4/1998 | Zook | 360/49 |
| 5,757,822 | A | * | 5/1998 | Fisher et al. | 714/755 |
| 5,781,590 | A | * | 7/1998 | Shiokawa et al. | 375/341 |
| 5,936,558 | A | * | 8/1999 | Shafiee et al. | 341/59 |
| 5,949,831 | A | * | 9/1999 | Coker et al. | 375/341 |
| 6,046,874 | A | * | 4/2000 | Takahashi | 360/65 |
| 6,111,835 | A | * | 8/2000 | Honma | 369/59.13 |
| 6,122,120 | A | * | 9/2000 | Shimoda | 360/46 |
| 6,148,043 | A | * | 11/2000 | Fujimoto | 375/341 |
| 6,501,610 | B1 | * | 12/2002 | Sugawara et al. | 360/65 |

* cited by examiner

*Primary Examiner*—William Korzuch
*Assistant Examiner*—Kim-Kwok Chu
(74) *Attorney, Agent, or Firm*—Greer, Burns & Crain, Ltd.

(57) ABSTRACT

In a data reproduction method and apparatus of the present invention, a Viterbi detection unit is provided, the Viterbi detection unit having a plurality of detectors each providing a first partial response signal with a first constraint length from a first sequence of samples derived from a first readout signal. One of connection and disconnection of the plurality of detectors in the Viterbi detection unit is selected in response to a timing signal, wherein, when the connection of the plurality of detectors is selected, the Viterbi detection unit provides a second partial response signal with a second constraint length from a second sequence of samples derived from a second readout signal, the second constraint length being different from the first constraint length.

10 Claims, 19 Drawing Sheets

DUAL-MODE CONFIGURATION

SINGLE-MODE CONFIGURATION

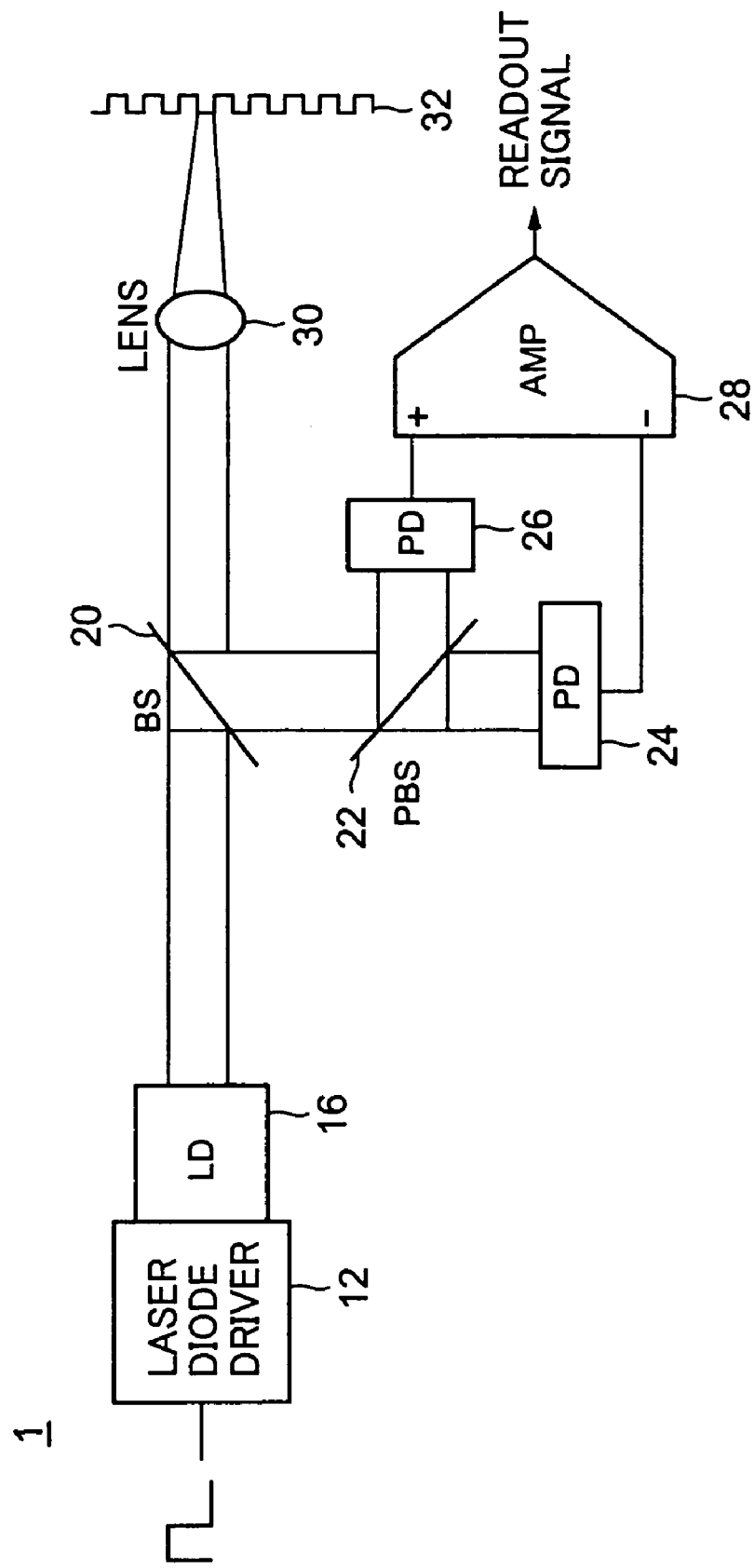

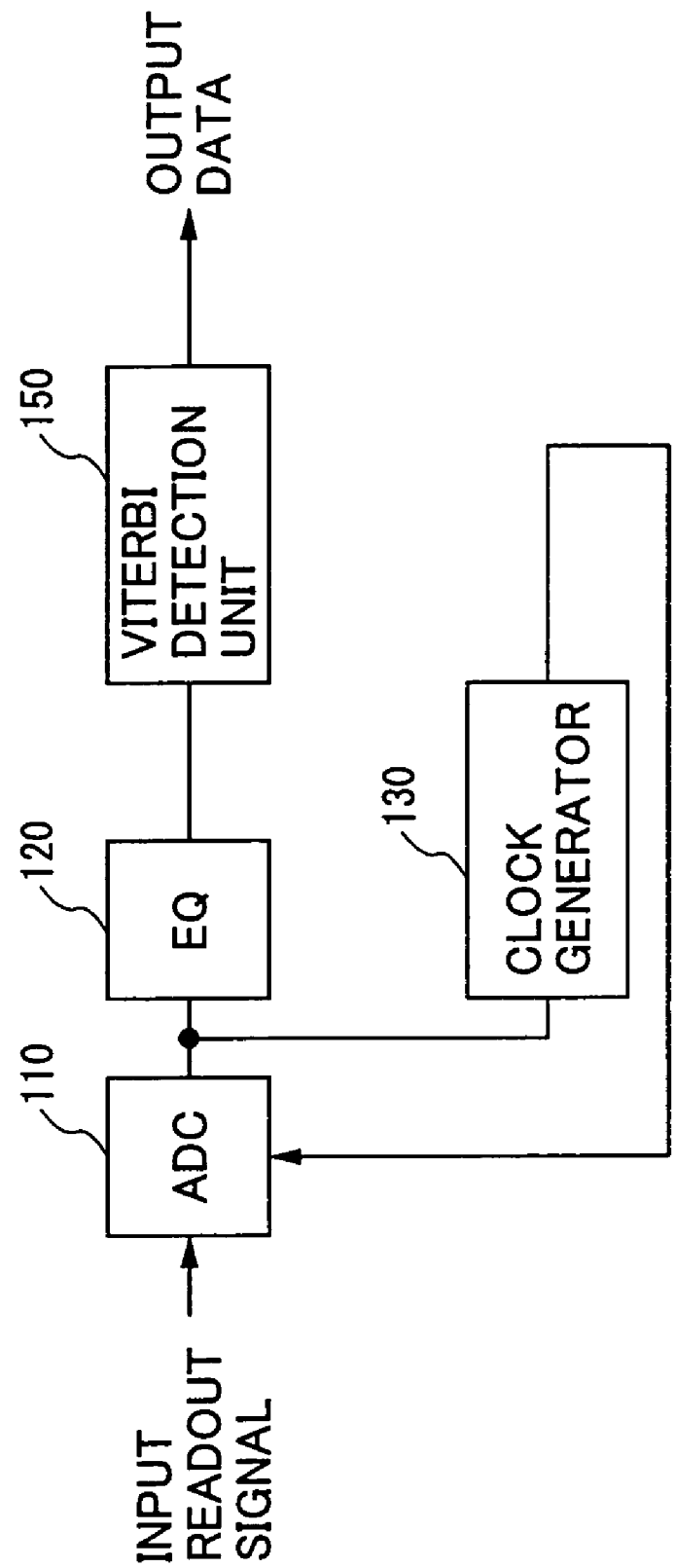

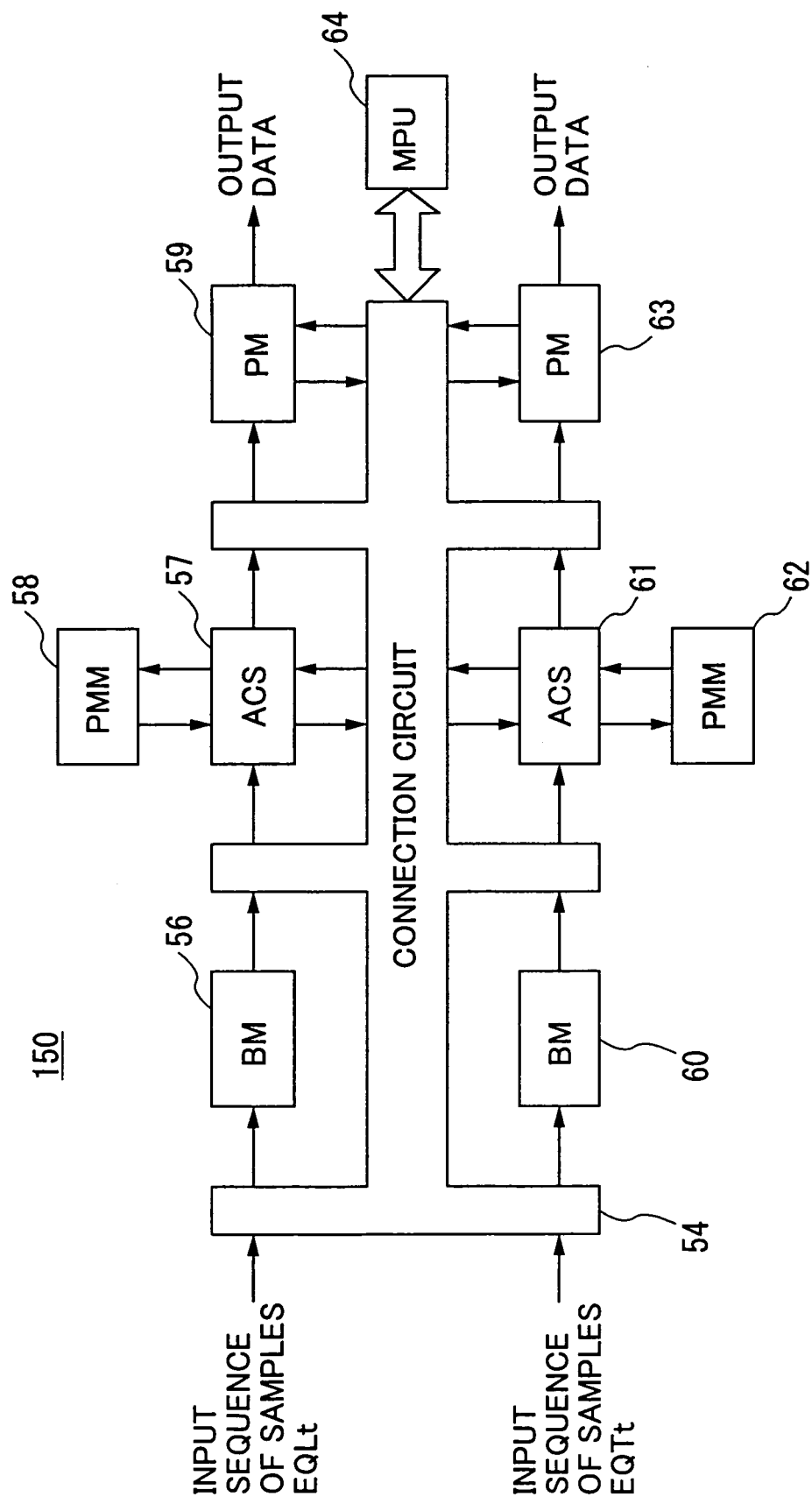

FIG. 9A

IN CASE OF PR(1, 1, 0, X)

| TIME | t-3 | t-2 | t-1 | t | | Ph |
|---|---|---|---|---|---|---|
| STATE SL0 | X | 0 | 0 | 0 | SL0 | PL0=0 |
| SL1 | X | 1 | 0 | 0 | SL0 | PL1=0 |
| ~~SL2~~ | ~~X~~ | ~~0~~ | ~~1~~ | ~~0~~ | ~~SL1~~ | |
| SL3 | X | 1 | 1 | 0 | SL1 | PL3=1 |
| SL0 | X | 0 | 0 | 1 | SL2 | PL4=1 |
| ~~SL1~~ | ~~X~~ | ~~1~~ | ~~0~~ | ~~1~~ | ~~SL2~~ | |
| SL2 | X | 0 | 1 | 1 | SL3 | PL6=2 |
| SL3 | X | 1 | 1 | 1 | SL3 | PL7=2 |
| ST0 | X | 0 | 0 | 0 | ST0 | PT0=0 |
| ST1 | X | 1 | 0 | 0 | ST0 | PT1=0 |
| ~~ST2~~ | ~~X~~ | ~~0~~ | ~~1~~ | ~~0~~ | ~~ST1~~ | |
| ST3 | X | 1 | 1 | 0 | ST1 | PT3=1 |
| ST0 | X | 0 | 0 | 1 | ST2 | PT4=1 |
| ~~ST1~~ | ~~X~~ | ~~1~~ | ~~0~~ | ~~1~~ | ~~ST2~~ | |
| ST2 | X | 0 | 1 | 1 | ST3 | PT6=2 |
| ST3 | X | 1 | 1 | 1 | ST3 | PT7=2 |

DUAL MODE

FIG. 9B

IN CASE OF PR(1, 3, 3, 1)

| TIME | t-3 | t-2 | t-1 | t | | Ph |
|---|---|---|---|---|---|---|
| STATE SL0 | 0 | 0 | 0 | 0 | SL0 | PL0=0 |
| ~~SL1~~ | ~~0~~ | ~~1~~ | ~~0~~ | ~~0~~ | ~~ST0~~ | PL1=0 |
| ~~SL2~~ | ~~0~~ | ~~0~~ | ~~1~~ | ~~0~~ | ~~SL1~~ | |
| SL3 | 0 | 1 | 1 | 0 | ST1 | PL3=6 |
| SL0 | 0 | 0 | 0 | 1 | SL2 | PL4=1 |
| ~~SL1~~ | ~~0~~ | ~~1~~ | ~~0~~ | ~~1~~ | ~~ST2~~ | |
| SL2 | 0 | 0 | 1 | 1 | SL3 | PL6=4 |
| SL3 | 0 | 1 | 1 | 1 | ST3 | PL7=7 |
| ST0 | 1 | 0 | 0 | 0 | SL0 | PT0=1 |
| ST1 | 1 | 1 | 0 | 0 | ST0 | PT1=4 |
| ~~ST2~~ | ~~1~~ | ~~0~~ | ~~1~~ | ~~0~~ | ~~SL1~~ | |
| ST3 | 1 | 1 | 1 | 0 | ST1 | PT3=7 |
| ST0 | 1 | 0 | 0 | 1 | SL2 | PT4=1 |
| ~~ST1~~ | ~~1~~ | ~~1~~ | ~~0~~ | ~~1~~ | ~~ST2~~ | |
| ~~ST2~~ | ~~1~~ | ~~0~~ | ~~1~~ | ~~1~~ | ~~SL3~~ | |
| ST3 | 1 | 1 | 1 | 1 | ST3 | PT7=8 |

SINGLE MODE

FIG. 10A
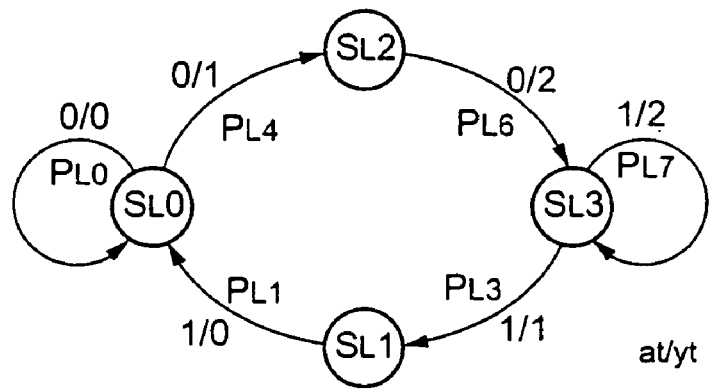
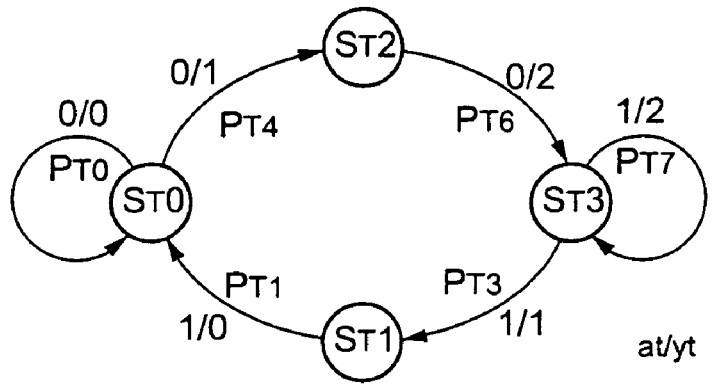
FIG. 10B
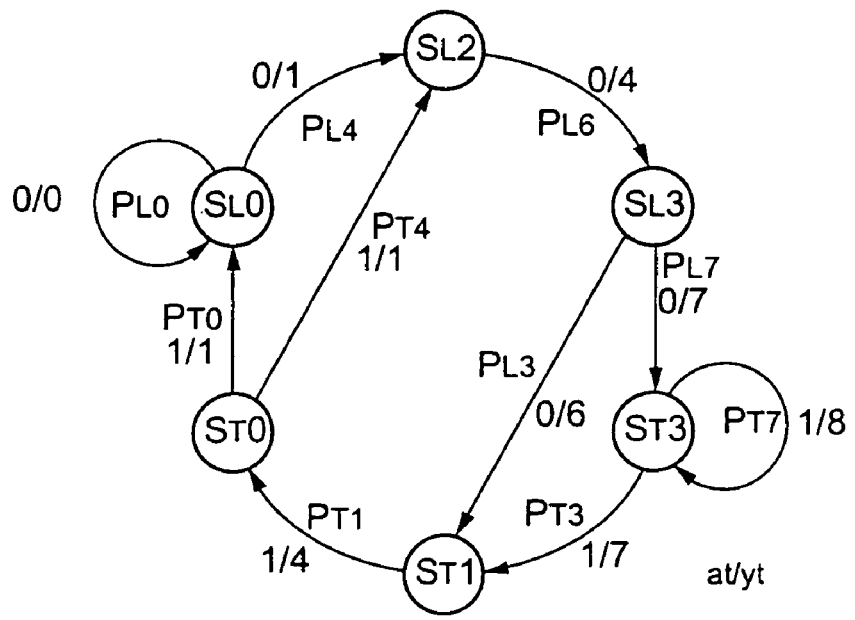

FIG. 13A

PML(t, 0)=min [PML(t-1, 0) + BML0 , PML(t-1, 1) + BML1]     ;DL0
PML(t, 1) =                          PML(t-1, 3) + BML3       ;DL1
PML(t, 2) =        PML(t-1, 0) + BML4 ,                        ;DL2
PML(t, 3)=min [PML(t-1, 2) + BML6 , PML(t-1, 3) + BML7]       ;DL3

PMT(t, 0)=min [PMT(t-1, 0) + BMT0 , PMT(t-1, 1) + BMT1]     ;DT0
PMT(t, 1) =                          PMT(t-1, 3) + BMT3       ;DT1
PMT(t, 2) =        PMT(t-1, 0) + BMT4                          ;DT2
PMT(t, 3)=min [PMT(t-1, 2) + BMT6 , PMT(t-1, 3) + BMT7]       ;DT3

FIG. 13B

PML(t, 0)=min [PML(t-1, 0) + BML0 , PMT(t-1, 0) + BMT0]     ;DL0
PML(t, 2)=min [PML(t-1, 0) + BML4 , PMT(t-1, 0) + BMT4]     ;DT0
PML(t, 3) =        PML(t-1, 2) + BML6                          ;DT2
PMT(t, 0) =                          PMT(t-1, 1) + BMT1       ;DL1
PMT(t, 1)=min [PML(t-1, 3) + BML3 , PMT(t-1, 3) + BMT3]     ;DL3
PMT(t, 3)=min [PML(t-1, 3) + BML7 , PMT(t-1, 3) + BMT7]     ;DT3

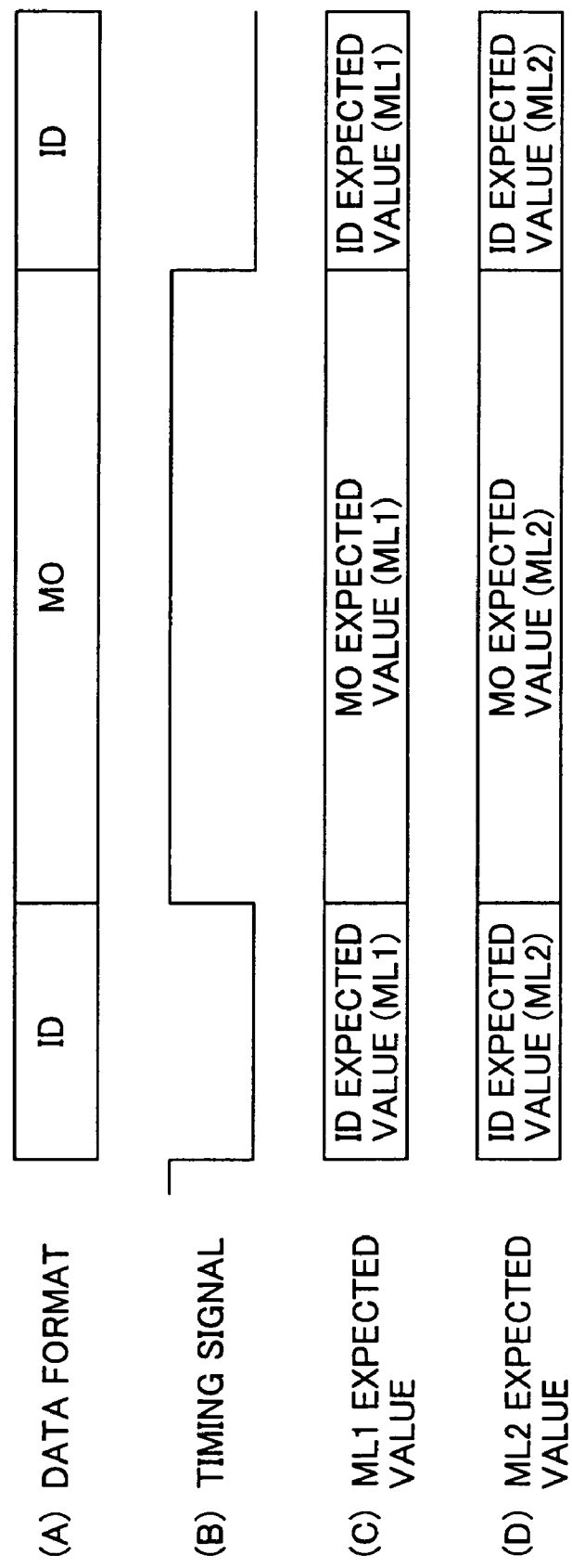

DATA REPRODUCTION METHOD AND APPARATUS

BACKGROUND OF THE INVENTION

1. Field of the Invention

The present invention generally relates to a data reproduction method and apparatus, and more particularly to a data reproduction method and apparatus for recovering data from a readout signal obtained from an optical storage medium to which the data is written at a high recording density.

2. Description of the Related Art

With recent developments of inexpensive, large-capacity magneto-optical disks with good reliability, the use of such media for recording and reproduction of pictures, image data, program codes and others is increasing in various fields.

There is the demand for magneto-optical disk drives that match with the requirements of large-capacity magneto-optical disks, and the disk drives require the ability to record data onto the medium at a high recording density and the ability to reproduce the data from the medium at a high density with good accuracy. A magnetic field modulation recording technique is known as a method of recording data onto the medium at a high recording density. Meanwhile, a magnetically induced super resolution (MSR) technique that utilizes an MSR medium is known as a method of reproducing data from the medium at a high density.

In a conventional partial response maximum likelihood (PRML) technique, the data reproduction that requires maximum likelihood estimation of a partial response with a large constraint length and a partial response with a small constraint length is carried out by making use of a single PRML system. In designing the PRML system, it is necessary that the PRML circuit match with the partial response having a larger constraint length. However, if such requirements are met, the size of the PRML circuit is increased in proportion to the constraint length of the partial response, and such PRML circuit is difficult to implement.

SUMMARY OF THE INVENTION

In order to overcome the above-described problems, it is an object of the present invention to provide an improved data reproduction apparatus that reliably produces both a partial response signal with a large constraint length and a partial response signal with a small constraint length without increasing an implementation cost.

Another object of the present invention is to provide an improved data reproduction method that reliably produces both a partial response signal with a large constraint length and a partial response signal with a small constraint length without increasing an implementation cost.

According to one preferred embodiment of the present invention, a data reproduction apparatus comprises: a Viterbi detection unit having a plurality of detectors each providing a first partial response signal with a first constraint length from a first sequence of samples derived from a first readout signal; and a connection unit selecting one of connection and disconnection of the plurality of detectors in the Viterbi detection unit in response to a timing signal, wherein, when the connection of the plurality of detectors is selected by the connection unit, the Viterbi detection unit provides a second partial response signal with a second constraint length from a second sequence of samples derived from a second readout signal, the second constraint length being different from the first constraint length.

According to another preferred embodiment of the present invention, a data reproduction method comprises the steps of: providing a Viterbi detection unit having a plurality of detectors each providing a first partial response signal with a first constraint length from a first sequence of samples derived from a first readout signal; and selecting one of connection and disconnection of the plurality of detectors in the Viterbi detection unit in response to a timing signal, wherein, when the connection of the plurality of detectors is selected, the Viterbi detection unit provides a second partial response signal with a second constraint length from a second sequence of samples derived from a second readout signal, the second constraint length being different from the first constraint length.

In the above preferred embodiments, one of connection and disconnection of the plurality of Viterbi detectors in the Viterbi detection unit is selected in conformity with the different constraint lengths of the ID-section readout signal and the MO-section readout signal. Each of the plurality of Viterbi detectors in the Viterbi detection unit provides, when they are disconnected, the partial response signal with a small constraint length (the first constraint length). When they are connected together, the Viterbi detection unit provides the partial response signal with a large constraint length (the second constraint length). Therefore, it is possible for the data reproduction method and apparatus of the above preferred embodiments to reliably reproduce the data from the optical storage medium with a relatively low-implementation cost. The data reproduction method and apparatus of the above preferred embodiments are effective in providing good accuracy of the data reproduction from the optical storage media with a relatively low-implementation cost.

BRIEF DESCRIPTION OF THE DRAWINGS

Other objects, features and advantages of the present invention will become apparent from the following detailed description when read in conjunction with the accompanying drawings.

FIG. 5 is a block diagram of a data reproduction optical system in a magneto-optical disk drive in which the data reproduction method and apparatus of the present invention are embodied.

FIG. 6 is a block diagram of one preferred embodiment of the data reproduction apparatus of the invention which is applied to the magneto-optical disk drive.

FIG. 8 is a block diagram of a Viterbi detection unit in the data reproduction apparatus of the present embodiment.

FIG. 9A and FIG. 9B are diagrams for explaining the state transitions in the dual-mode configuration and in the single-mode configuration.

FIG. 10A and FIG. 10B are state diagrams of the dual-mode configuration and the single-mode configuration which respectively represent in the state transitions of FIG. 9A and the state transitions of FIG. 9B.

FIG. 13A and FIG. 13B are diagrams for explaining path metric computations which are performed by the data reproduction apparatus of the present embodiment.

FIG. 18 is a timing chart for explaining the setting of the expected values in the Viterbi detection unit of the data reproduction apparatus of the present embodiment.

DETAILED DESCRIPTION OF PREFERRED EMBODIMENTS

Before describing preferred embodiments of the present invention, a description will be provided of a data reproduction apparatus with reference to FIG. 1 through FIG. 4B, in order to facilitate understanding of the concepts of the present invention.

Figure 1:
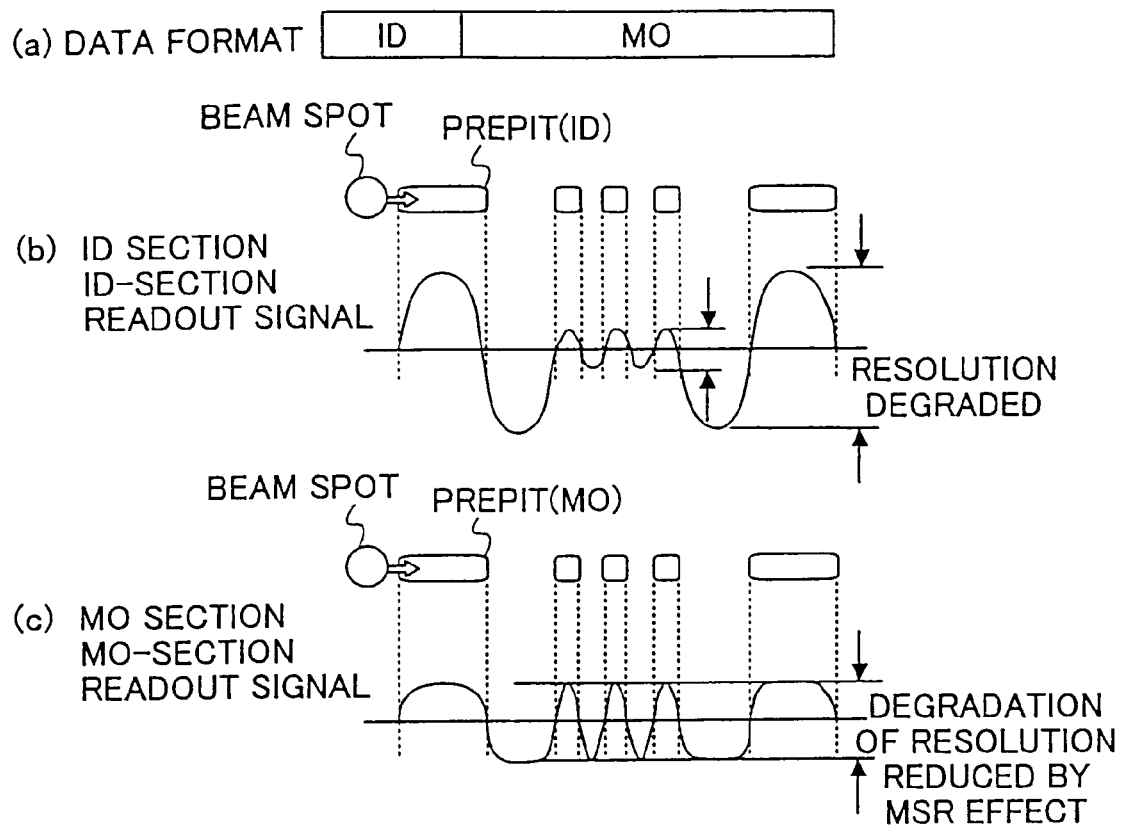
FIG. 1 is a prior art diagram for explaining a data format of a magneto-optical disk and the waveforms of readout signals of respective sections of the data format of the disk.

FIG. 1 shows a data format of a magneto-optical disk and the waveforms of readout signals, which are obtained from respective sections of the data format of the disk.

As indicated by (a) in FIG. 1, the data format of a magneto-optical (MO) disk includes an ID section and a MO section. As indicated by (b) in FIG. 1, in the ID section of the data format, a sequence of prepits is formed on the disk along the track, and the recorded information of the ID section is reproduced from the disk by focusing a light beam onto the disk surface, scanning the prepit along the track of the disk with the beam spot, and detecting the amount of a reflection beam from the prepit on the disk. The waveform of an ID-section readout signal is shown in (b) in FIG. 1. The amplitude of the readout signal corresponding to a long prepit becomes large but the amplitude of the readout signal corresponding to a short prepit becomes excessively small. The resolution of the ID-section readout signal is somewhat degraded.

The MO section of the data format of the disk includes, as indicated by (c) in FIG. 1, a sequence of data pits that is formed on the disk along the track subsequent to the prepits, and the recorded information of the MO section is reproduced from the disk by focusing a light beam onto the disk surface, scanning the data pit along the track with the beam spot, and detecting the direction of polarization of a reflection beam from the data pit on the disk. The waveform of an MO-section readout signal is shown in (c) in FIG. 1. In a case of the MO-section readout signal, by making use of the MSR effect, the degradation of the readout signal as in the ID-section readout signal can be reduced. Namely, the amplitude of the readout signal corresponding to a long data pit and the amplitude of the readout signal corresponding to a short data pit are substantially at the same level.

Figure 2:
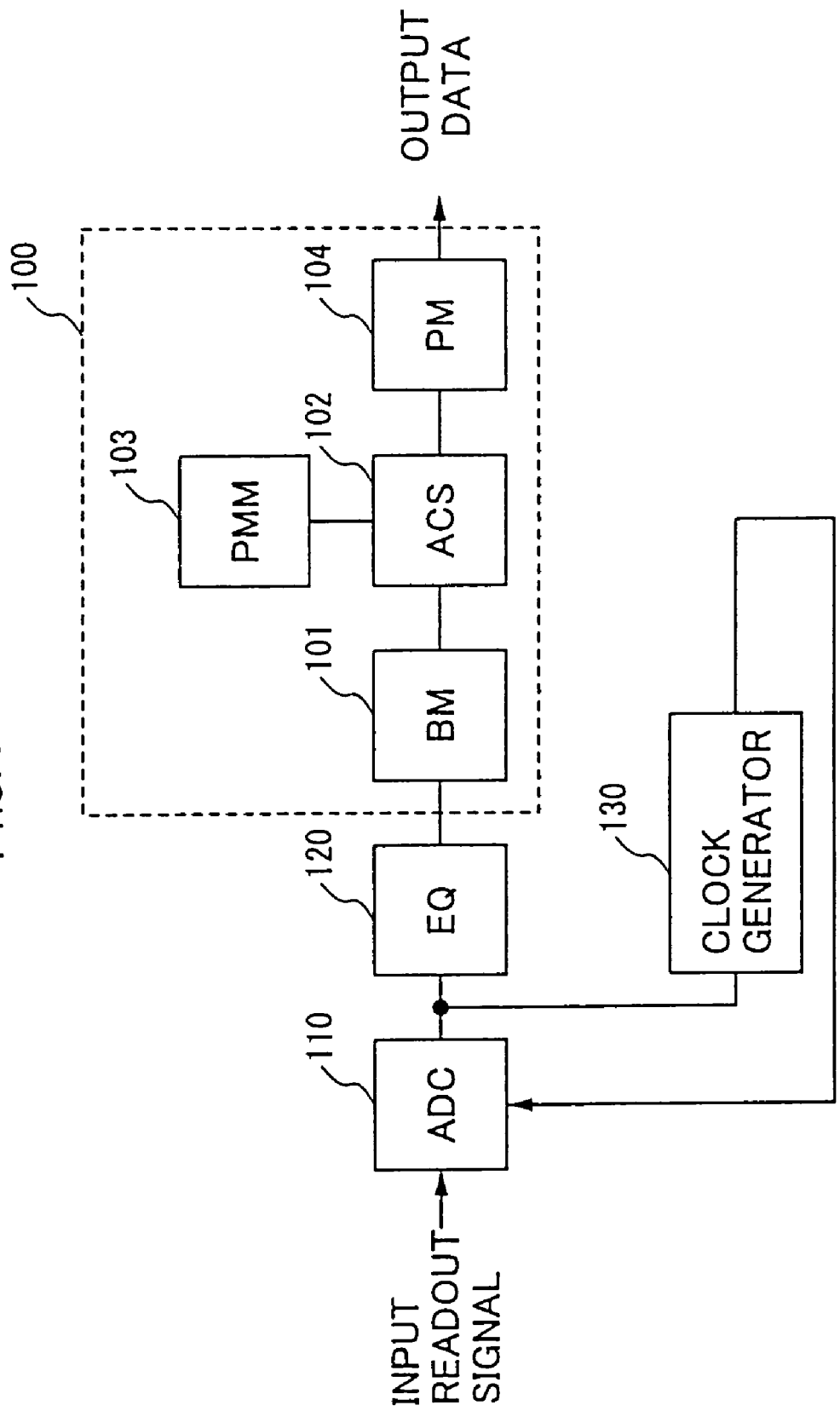
FIG. 2 is a prior art block diagram of a data reproduction apparatus including a Viterbi detector.

FIG. 2 shows a configuration of a data reproduction apparatus including a Viterbi detector.

As shown in FIG. 2, the data reproduction apparatus receives a readout signal as the input signal to an analog-to-digital converter (ADC) 110, and this readout signal is supplied, through an analog signal processing using an amplifier and a low-pass filter (both not shown), to the ADC 110. The ADC 110 converts the readout signal into a digital signal (or a sequence of samples), and this digital signal is supplied from the ADC 110 to a digital equalizer (EQ) 120.

In the data reproduction apparatus of FIG. 2, a clock generator 130 is provided to generate a clock signal in response to the sequence of samples at the output of the ADC 110, and supplies the clock signal to the ADC 110. The ADC 110 operates on the readout signal and sequentially supplies the sampled signal to the EQ 120 in synchronization with the clock signal output by the clock generator 130.

The EQ 120 performs partial response equalization of the sequence of samples supplied by the ADC 110, and supplies the sequence of the processed samples to a Viterbi detector 100. The Viterbi detector 100 performs maximum likelihood sequence estimation of the sequence of samples supplied by the EQ 120, so as to detect the recorded information in accordance with the Viterbi algorithm, and outputs the detected data. Therefore, the data reproduction apparatus provides the data reproduction based on the partial response maximum likelihood (PRML) technique that combines the partial response equalization with the Viterbi detection.

Although there is no indication in the block diagram of FIG. 2, the clock generator 130 supplies the clock signal to each of the EQ 120 and the Viterbi detector 100, and the EQ120 and the Viterbi detector 100 also operate in synchronization with the clock signal output by the clock generator 130.

As shown in FIG. 2, in the Viterbi detector 100, a branch metric computation (BM) unit 101, an add-compare-select (ACS) unit 102, a path metric memory (PMM) 103 and a pass memory (PM) 104 are provided. With the functions of these elements 101 through 104, the Viterbi detector 100 performs the maximum likelihood sequence estimation of the sequence of samples supplied by the EQ 120, so as to detect the recorded information in accordance with the Viterbi algorithm, and outputs the detected data. The Viterbi detector 100 achieves the reproduction of high-density recorded information at a high density with good accuracy. Conventionally, in the data reproduction apparatus of the above type including the Viterbi detector 100, the data reproduction that requires a given partial response maximum likelihood estimation is performed by making use of a single PRML system.

However, as in the waveforms of FIG. 1, the resolution of the ID-section readout signal is degraded, but the degradation of the resolution with respect to the MO-section readout signal is reduced by using the MSR effect. This will result in a significant difference between the partial response (PR)

of the ID-section readout signal and the partial response (PR) of the MO-section readout signal.

Figure 3:
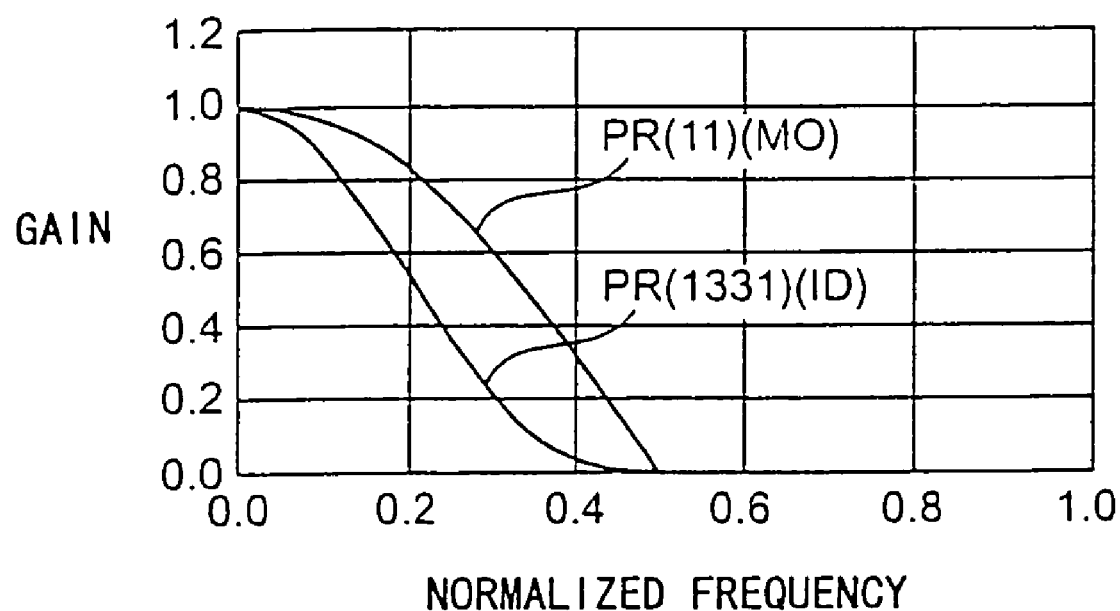
FIG. 3 is a prior art diagram for explaining the modulation transfer function characteristics of an ID-section readout signal and a MO-section readout signal.

FIG. 3 shows the modulation transfer function MTF characteristics of the ID-section readout signal and the MO-section readout signal. In determining the MTF characteristics of both the readout signals, the PR (1, 3, 3, 1) is taken as corresponding to the ID-section readout signal, and the PR (1, 1) is taken as corresponding to the MO-section readout signal.

In the conventional PRML technique, the data reproduction that requires the partial response maximum likelihood estimation of both the PR (1, 3, 3, 1) for the ID-section readout signal and the PR (1, 1) for the MO-section readout signal is carried out by making use of a single PRML system. The PR (1, 3, 3, 1) has a relatively large constraint length and the PR (1, 1) has a relatively small constraint length. In designing the PRML system, it is necessary that the PRML circuit match with the PR (1, 3, 3, 1) having a larger constraint length. However, if such requirements are met, the size of the PRML circuit is increased in proportion to the constraint length of the PR, and such PRML circuit is difficult to implement.

Further, when the optical modulation edge recording is used to form a sequence of data pits on the disk for the MO-section of the data format, the edges of the data pits being written to the disk may be shifted along the track due to changes of the environmental temperature or the thermal energy accumulation during the recording. This problem is called the edge shift.

Figure 4A:
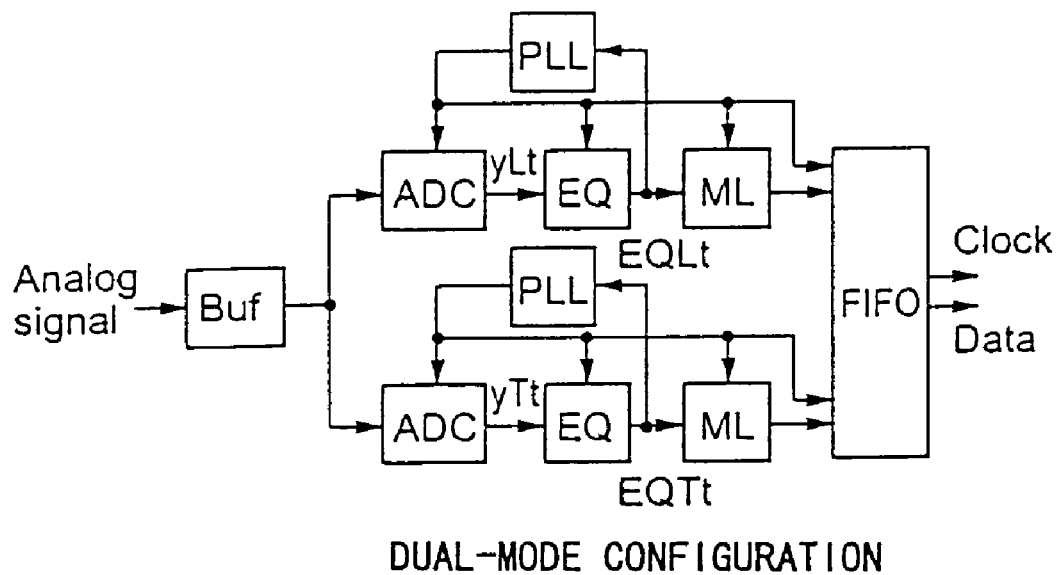
FIG. 4A and FIG. 4B are prior art block diagrams of a dual-mode configuration and a single-mode configuration of a PRML system in the data reproduction apparatus.
Figure 4B:
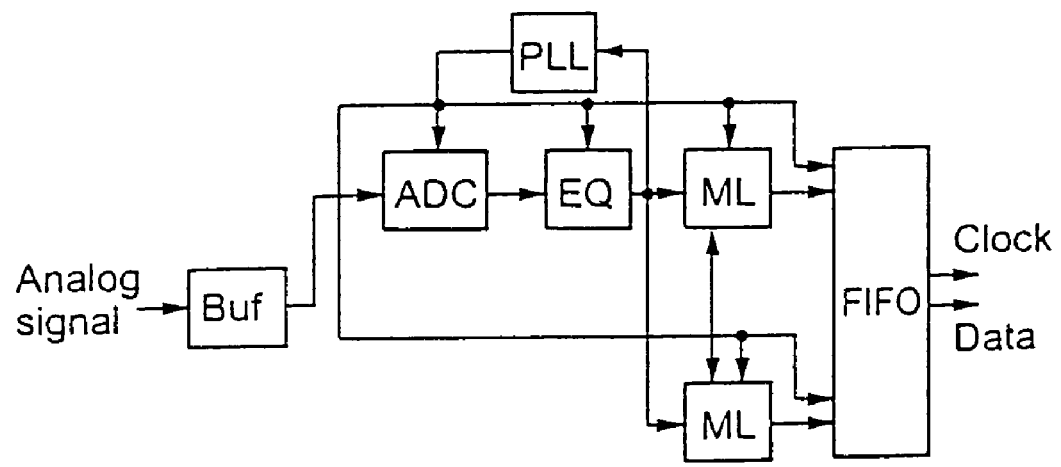

FIG. 4A and FIG. 4B respectively show a dual-mode configuration and a single-mode configuration of a PRML system in the data reproduction apparatus.

The dual-mode configuration shown in FIG. 4A is proposed to provide the ability to combat the edge shift. In the dual-mode configuration of FIG. 4A, the leading edge and the trailing edge of each of the data pits (the MO section) are separately detected by making use of a leading-edge PRML system and a trailing edge PRML system. And, the edge shift is eliminated by adding a leading-edge partial response signal and a trailing-edge partial response signal together. Hence, the dual-mode configuration is appropriate to provide the ability to effectively combat the edge shift.

However, the problem of the edge shift as in the MO-section readout signal does not arise in the ID-section readout signal obtained from the prepits (the ID section) of the disk. The prepits are precisely formed on the MO disk during manufacture, and there is substantially no edge shift that is caused by the ID-section readout signal. Therefore, it is possible that the single-mode PRML configuration of FIG. 4B adequately carries out the data reproduction. It is not necessary to use the dual-mode PRML configuration of FIG. 4A when performing the data reproduction from the ID-section readout signal.

In order to eliminate the above problems, the data reproduction method and apparatus of the present invention are configured to provide a simple, inexpensive data reproduction method and apparatus that reliably produce both the partial response signal with a large constraint length and the partial response signal with a small constraint length without increasing an implementation cost.

A description will now be provided of the preferred embodiments of the present invention with reference to FIG. 5 through FIG. 19B.

FIG. 5 shows a data reproduction optical system for use in a magneto-optical disk drive in which the data reproduction method and apparatus of the invention are embodied.

In the present embodiment, the data reproduction method and apparatus of the invention are applied to a data reproduction part of a magneto-optical disk drive for the purpose of description. However, the present invention is not limited to this embodiment, and the data reproduction method and apparatus of the invention may be applicable to other data recording/reproducing systems.

As shown in FIG. 5, in the data reproduction optical system of the magneto-optical disk drive, a laser diode driver 12 is provided so that the laser diode driver 12 is connected with a laser diode (LD) 16. When data is reproduced from a magneto-optical (MO) disk 32, a pulsed drive signal is supplied to the laser diode driver 12.

When the drive signal is received at the LD driver 12, the LD driver 12 causes the LD 16 to emit a laser beam. The laser beam emitted by the LD 16 is passed through a beam splitter (BS) 20 to a focusing lens 30. The focusing lens 30 converts the laser beam into a converging laser beam and focuses the laser beam onto the MO disk 32 so that the converging laser beam forms a beam spot on a recording layer of the MO disk 32. The data reproduction part of the magneto-optical disk drive also produces a magnetic field applied to the recording layer of the MO disk 32.

The BS 20 directs the reflected beam away from the MO disk 32 to a polarizing beam splitter (PBS) 22. The polarizing beam splitter 22 splits the beam, supplied from the BS 20, into two parts depending on its polarization components, one entering a photo diode (PD) 24 and the other entering a photo diode (PD) 26. Each of the photo diodes 24 and 25 provides photoelectric conversion of the received beam. As the result of the photoelectric conversion, the photo diode 24 supplies an electric signal to an input of a differential amplifier (AMP) 28, while the photo diode 26 supplies an electric signal to the other input of the amplifier 28. When the signals from the photodiodes 24 and 26 are received at the amplifier 28, the amplifier 28 amplifies a differential signal of the two received signals, and outputs the amplified signal as a readout signal.

FIG. 6 shows one preferred embodiment of the data reproduction apparatus of the invention.

In the present embodiment, the data reproduction apparatus receives, as the input signal to an analog-to-digital converter (ADC) 110, the readout signal that is supplied from the amplifier 28 of the data reproduction optical system of the magneto-optical disk drive shown in FIG. 5. The ADC 110 converts the readout signal into a digital signal (or a sequence of samples), and this digital signal is supplied from the ADC 110 to a digital equalizer (EQ) 120.

Incidentally, when the necessity arises on the disk drive, a waveform shaping filter may be provided between the output of the amplifier 28 of the optical system of FIG. 5 and the input the ADC 110 of the data reproduction apparatus of FIG. 6.

In the data reproduction apparatus of FIG. 6, a clock generator 130 is provided to generate a clock signal in response to the sequence of samples at the output of the ADC 110, and supplies it to the ADC 110. The ADC 110 operates on the readout signal and sequentially supplies the sampled signal to the EQ 120 in synchronization with the clock signal output by the clock generator 130.

The EQ 120 performs partial response equalization of the sequence of samples supplied by the ADC 110, and supplies the sequence of the processed samples to a Viterbi detection unit 150. The Viterbi detection unit 150 performs maximum likelihood sequence estimation of the sequence of samples supplied by the EQ 120, so as to detect the recorded information in accordance with the Viterbi algorithm, and outputs the detected data. Therefore, the EQ 120 and the Viterbi detection unit 150 provide the data reproduction based on the partial response maximum likelihood (PRML) technique that combines the partial response equalization with the Viterbi detection. The data reproduction method and apparatus of the present invention are characterized by the configuration of the Viterbi detection unit 150, which will be described below in greater detail.

In the data reproduction apparatus of FIG. 6, the Viterbi detection unit 150 is configured with a plurality of Viterbi detectors including at least a first Viterbi detector and a second Viterbi detector. Each of the first and second Viterbi detectors solely provides a partial response signal with a small constraint length from the sequence of samples derived from the MO-section readout signal. This configuration of the Viterbi detection unit 150 will be called a dual-mode configuration of the partial response maximum likelihood (PRML) scheme. On the other hand, the first and second Viterbi detectors in combination provide a partial response signal with a large constraint length from the sequence of samples derived from the ID-section readout signal. This configuration of the Viterbi detection unit 150 will be called a single-mode configuration of the PRML scheme. To achieve both the functions of the two configurations, the Viterbi detection unit 150 is provided with a connection circuit 54 (which will be described later), so that the Viterbi detection unit 150 is operable in a selected one of the single-mode configuration and the dual-mode configuration.

A description will be provided of the configuration of the Viterbi detection unit 150 in the data reproduction apparatus of the present embodiment.

Figure 7A:
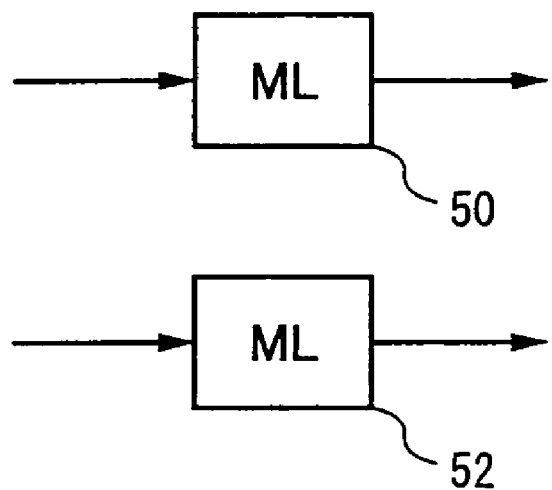
FIG. 7A and FIG. 7B are block diagrams of a dual-mode configuration and a single-mode configuration of Viterbi detection, one of which is selected by the data reproduction apparatus of the present embodiment.
Figure 7B:
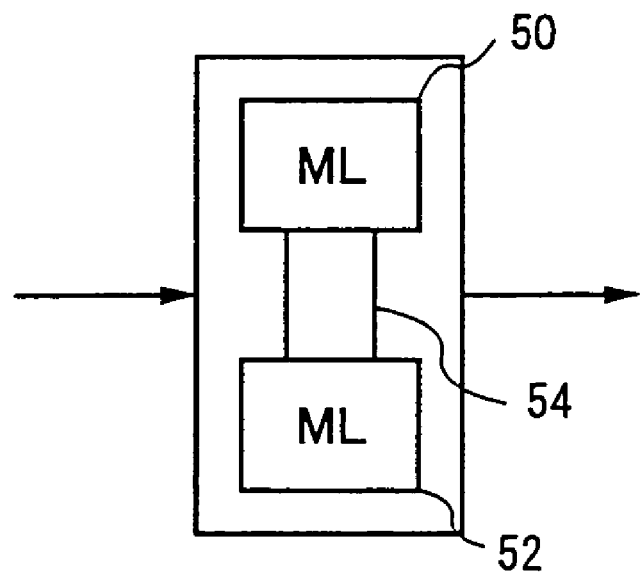

FIG. 7A and FIG. 7B respectively show the dual-mode configuration and the single-mode configuration of the Viterbi detection unit 150, one of which is selected by the data reproduction apparatus of the present embodiment.

As shown in FIG. 7A, when the dual-mode configuration of the PRML scheme is selected, each of a first Viterbi detector 50 and a second Viterbi detector 52 in the Viterbi detection unit 150 solely provides a partial response signal with a small constraint length from the sequence of samples derived from the MO-section readout signal indicated by (c) in FIG. 1. The dual-mode configuration is appropriate to provide the ability to effectively combat the edge shift. In FIG. 7A and FIG. 7B, the above-described partial response maximum likelihood function of each of the first and second Viterbi detectors 50 and 52 is indicated by "ML".

As shown in FIG. 7B, when the single-mode configuration of the PRML scheme is selected, the first and second Viterbi detectors 50 and 52 in combination provide a partial response signal with a large constraint length from the sequence of samples derived from the ID-section readout signal indicated by (b) in FIG. 1.

As described above, the Viterbi detection unit 150 includes the connection circuit 54 that selects one of connection and disconnection of the first and second Viterbi detectors 50 and 52 in response to a timing signal, in order to select one of the dual-mode configuration and the single-mode configuration. When processing the ID-section readout signal on the data reproduction apparatus, the connection circuit 54 selects the connection of the first and second Viterbi detectors 50 and 52 as shown in FIG. 7B. Therefore, the first and second Viterbi detectors 50 and 52 in combination provide a partial response signal with a large constraint length from the sequence of samples derived from the ID-section readout signal. The single-mode configuration is appropriate to provide the ability to combat the degradation of the resolution of the ID-section readout signal.

FIG. 8 shows a configuration of the Viterbi detection unit 150 in the data reproduction apparatus of the present embodiment.

As shown in FIG. 8, the Viterbi detection unit 150 is provided with the first and second Viterbi detectors. In the Viterbi detection unit 150 of FIG. 8, a branch metric computation (BM) unit 56, an add-compare-select (ACS) unit 57, a path metric memory (PMM) 58 and a pass memory (PM) 59 form the first Viterbi unit, while a branch metric computation (BM) unit 60, an add-compare-select (ACS) unit 61, a path metric memory (PMM) 62 and a pass memory (PM) 63 form the second Viterbi unit. The connection circuit 54 is provided in the Viterbi detection unit 150 to select one of connection and disconnection of each of the branch metric computation (BM) units 56 and 60, the add-compare-select (ACS) units 57 and 61, the path metric memories (PMM) 58 and 62 and the pass memories (PM) 59 and 63 in response to a timing signal. Further, a microprocessor unit (MPU) 64 is provided in the Viterbi detection unit 150 to control the connection circuit 54 by supplying the timing signal to the connection circuit 54.

As described above, the Viterbi detection unit 150 is provided with the first and second Viterbi detectors 50 and 52 and the connection circuit 54, and when the first and second Viterbi detectors 50 and 52 are disconnected from each other by the connection circuit 54, the Viterbi detection unit 150 provides a partial response signal with a small constraint length from the sequence of samples derived from the MO-section readout signal. On the other hand, when the first and second Viterbi detectors 50 and 52 are connected together by the connection circuit 54, the Viterbi detection unit 150 provides a partial response signal with a large constraint length from the sequence of samples derived from the ID-section readout signal.

In the Viterbi detection unit 150 of FIG. 8, by using the selective control of the connection and disconnection of the connection circuit 54, the MPU 64 is capable of controlling the destination of signal transmission (or the destination-side element of the Viterbi detection unit 150) to which an intermediate signal is transmitted from the source-side element among the respective elements of the first and second Viterbi detectors 50 and 52. Further, by using the selective control of the connection and disconnection of the connection circuit 54, the MPU 64 is capable of controlling the destination of transmission (or the receiving-side elements of the Viterbi detection unit 150) to which the input sequences of samples "EQLt" and "EQTt" supplied from the EQ 120 are forwarded. For example, it is possible that, in the Viterbi detection unit 150, the destination of signal transmission of a branch metric value at the output of the BM 56 be controlled so as to transmit it to the input of the ACS unit 61.

Next, a description will be given of the configuration and operations of the magneto-optical disk drive to which the data reproduction method and apparatus of the invention are applied.

In the present embodiment, the D restrictions that are the characteristics of the conventional (1, 7) RLCC are taken into consideration, and it is assumed that the PR (1, 3, 3, 1) corresponds to the ID-section readout signal, and the PR (1, 1, 0) corresponds to the MO-section readout signal.

FIG. 9A and FIG. 9B respectively show the state transitions in the dual-mode configuration in the case of the PR (1, 1, 0, X) and the state transitions in the single-mode configuration in the case of the PR (1, 3, 3, 1).

In FIG. 9A and FIG. 9B, the transition from the state $S_L1$ to the state $S_L2$ or vice versa, or the like, do not exist because of the D restrictions of the conventional (1, 7) RLCC, and they are discarded as indicated by the double lines. In the state transition tables of FIG. 9A and FIG. 9B, respective state transitions and their corresponding sequence of the preceding and the current samples are provided, and each row indicates the individual state name and the corresponding sample values. The leftmost column "Ph" of each of the state transition tables of FIG. 9A and FIG. 9B provides the expected values $P_L0$ through $P_L7$ for the related sequences of the specific sample values, and the expected values $P_T0$ through $P_T7$ for the related sequences of the specific sample values. The subscript letter "L" indicates the leading edge, and the subscript letter "T" indicates the trailing edge.

In the state transition table of FIG. 9A (or the dual-mode configuration), the expected value Ph in the case of the PR (1, k2, k3) with the constraint length=3 is computed in accordance with the following formula.

$$Ph = k1 \times Dt + k2 \times Dt\text{-}1 + k3 \times Dt\text{-}2 \quad (1)$$

In the state transition table of FIG. 9B (or the single-mode configuration), the expected value Ph in the case of the PR (k1, k2, k3, k4) with the constraint length=4 is computed in accordance with the following formula.

$$Ph = k1 \times Dt + k2 \times Dt\text{-}1 + k3 \times Dt\text{-}2 + k4 \times Dt\text{-}3 \quad (2)$$

In the above formulas (1) and (2), "Dt" represents the sampled data at the sampling instant "t". For example, "Dt-2", "Dt-1" and "Dt" indicate the three successive samples in the input sequence.

In the state transition table of FIG. 9A (the dual mode), when the state $S_L3$ is altered to the state $S_L1$, the expected value Ph for this case is computed by using the above formula (1) as being $P_L3=1$. Similarly, in the state transition table of FIG. 9B (the single mode), for example, when the state $S_L3$ is altered to the state $S_L1$, the expected value Ph for this case is computed by using the above formula (2) as being $P_L3=6$.

FIG. 10A shows state diagrams that correspond to the state transitions of the dual-mode configuration as shown in FIG. 9A, and FIG. 10B shows a state diagram that corresponds to the state transitions of the single-mode configuration as shown in FIG. 9B.

The upper state diagram of FIG. 10A corresponds to the state transitions of the dual-mode configuration related to the leading edge, and the lower state diagram of FIG. 10A corresponds to the state transitions of the dual-mode configuration related to the trailing edge. The two state diagrams are separately provided for the leading edge case and the trailing edge case of the dual-mode configuration. In FIG. 10A, "at/yt" in each of the upper and lower diagrams indicates the value of Dt-2/Ph.

The state diagram of FIG. 10B corresponds to the state transitions of the single-mode configuration. One state diagram is provided for the single-mode configuration. In FIG. 10B, "at/yt" indicates the value of Dt-3/Ph.

As described above, in the Viterbi detection unit 150 of the present embodiment, when processing the MO-section readout signal, the dual-mode configuration of the PRML is selected and the disconnection of the first and second Viterbi detectors 50 and 52 is selected by the connection circuit 54. Each of the first Viterbi detector 50 and the second Viterbi detector 52 in the Viterbi detection unit 150 solely provides a partial response signal with a small constraint length (=3) from the sequence of samples derived from the MO-section readout signal. On the other hand, when processing the ID-section readout signal, the single-mode configuration of the PRML is selected and the connection of the first and second Viterbi detectors 50 and 52 is selected by the connection circuit 54. The first and second Viterbi detectors 50 and 52 in combination provide a partial response signal with a large constraint length (=4) from the sequence of samples derived from the ID-section readout signal.

Figure 11A:
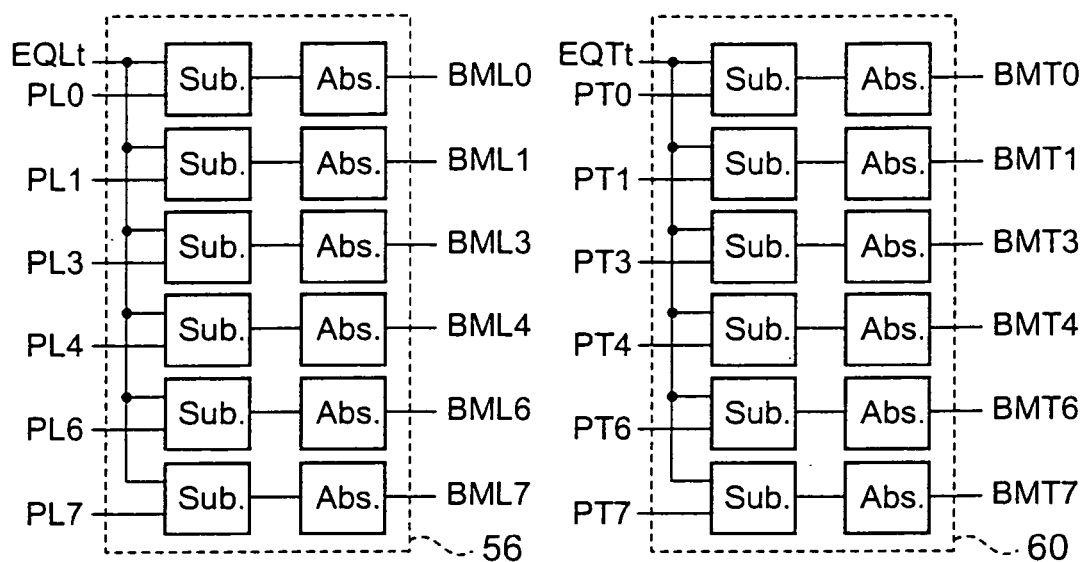
FIG. 11A and FIG. 11B are block diagrams of respective branch metric computation units of the dual-mode configuration and the single-mode configuration.
Figure 11B:
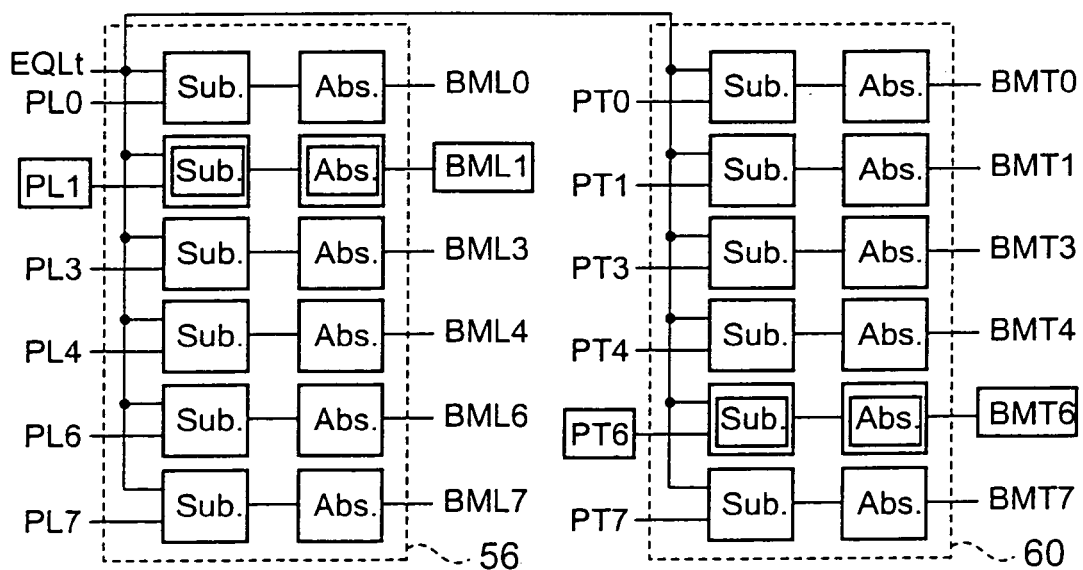

FIG. 11A shows an example of the branch metric computation (BM) units 56 and 60 of the dual-mode configuration, and FIG. 11B shows an example of the branch metric computation (BM) units 56 and 60 of the single-mode configuration.

As shown in FIG. 11A, when the dual-mode configuration is selected, the two input sequences of samples EQLt and EQTt are transmitted to the BM units 56 and 60 from the two analog-to-digital converters (ADC) through the two digital equalizers (EQ) as in the configuration of FIG. 4A. In addition, the two sequences of the expected values PLn and PTn (n=0, 1, 3, 4, 6, 7), which are shown in FIG. 9A, are transmitted to the BM units 56 and 60. The BM unit 56 includes pairs of a subtraction device (Sub) and an absolute-value device (Abs) connected in series. Each pair of the subtraction device and the absolute-value device in the BM unit 56 computes a difference between the received sample EQLt and the expected value PLn and takes its absolute value. As the results of such computations, the BM unit 56 outputs the branch metric values BMLn (n=0, 1, 3, 4, 6, 7). Similarly, the BM unit 60 includes pairs of a subtraction device (Sub) and an absolute-value device (Abs) connected in series. Each pair of the subtraction device and the absolute-value device in the BM unit 60 computes a difference between the received sample EQTn and the expected value PTn and takes its absolute value. As the results of such computations, the BM unit 60 outputs the branch metric values BMTn (n=0, 1, 3, 4, 6, 7).

In the above-described embodiment, the branch metric values are obtained by the BM units 56 and 60 through the subtraction devices and the absolute-value devices, in order to compare the magnitude of the received samples relative to the expected values. Alternatively, for this purpose, the branch metric values may be obtained by computing respective differences between the received samples and the expected values and taking the squares of the differences.

As shown in FIG. 11B, when the single-mode configuration is selected, the input sequence of samples EQLt is transmitted to each of the BM units 56 and 60 from the analog-to-digital converter (ADC) through the digital equalizer (EQ). In addition, the two sequences of the expected values PLn and PTn (n=0, 1, 3, 4, 6, 7), which are shown in FIG. 9B, are transmitted to the BM units 56 and 60. Each pair of the subtraction device (Sub) and the absolute-value device (Abs) in the BM unit 56 computes a difference between the received sample EQLt and the expected value PLn and takes its absolute value. As the results of such computations, the BM unit 56 outputs the branch metric values BMLn (n=0, 1, 3, 4, 6, 7). Similarly, each pair of the subtraction device (Sub) and the absolute-value device (Abs) in the BM unit 60 computes a difference between the received sample EQLn and the expected value PTn and takes its absolute value. As the results of such computations, the BM unit 60 outputs the branch metric values BMTn (n=0, 1, 3, 4, 6, 7).

As described above, in the Viterbi detection unit 150, when the disconnection of the first and second Viterbi detectors 50 and 52 is selected (the dual-mode configuration), the MPU 64 controls the connection circuit 54 such that the destinations of transmission of the two sequences of samples EQLt and EQTt are determined as being the BM units 56 and 60. When the connection of the first and second Viterbi detectors 50 and 52 is selected (the single-mode configuration), the MPU 64 controls the connection circuit 54 such that the destinations of transmission of only the input sequence of samples EQLt are determined as being the BM units 56 and 60.

Figure 12:
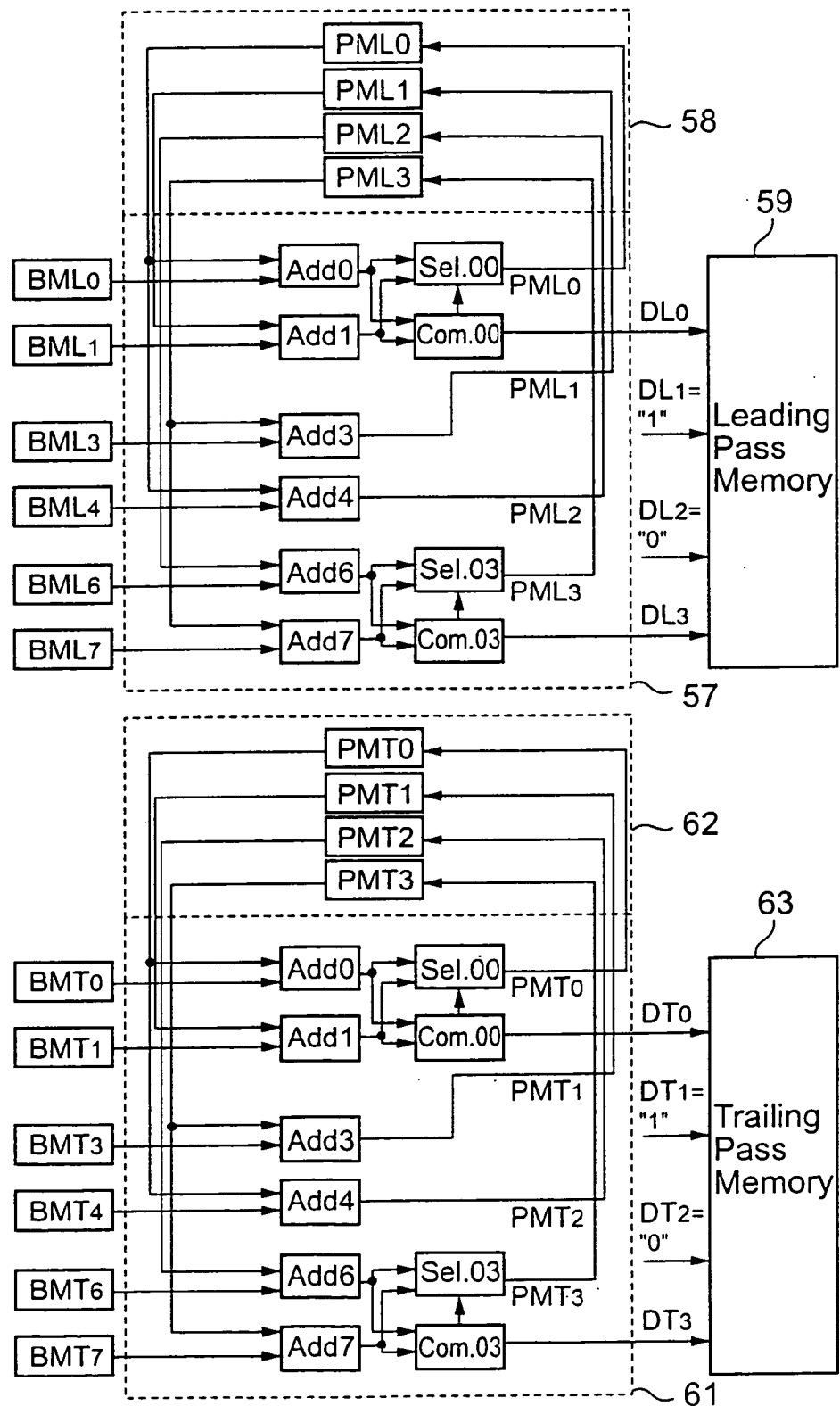
FIG. 12 is a block diagram of a configuration of add-compare-select units of the data reproduction apparatus of the present embodiment when the dual-mode configuration is selected.

FIG. 12 shows a configuration of the add-compare-select (ACS) units 57 and 61 of the data reproduction apparatus of the present embodiment when the dual-mode configuration is selected. FIG. 13A and FIG. 13B show examples of the path metric computations which are performed by the ACS units 57 and 61 of the present embodiment.

As shown in FIG. 12, the ACS units 57 and 61 include adders, comparators and selectors. When the dual-mode configuration is selected, the ACS unit 57 computes respective sums of the received branch metric value BMLn and the preceding path metric value PMLn sent by the PMM 58, compares two of the respective sums (BMLn+PMLn) at the outputs of the adders, and selects the smaller one of the two values (BMLn+PMLn) as the more probable value of the new path metrics (PMLm). The ACS unit 57 outputs the new path metric values PMLm (m=0, 1, 2, 3) to the PMM 58. This is based on the Viterbi algorithm. At the same time, the ACS unit 57 transmits the path selection information DLm (m=0, 1, 2, 3) to the leading-edge pass memory (PM) 59.

In addition, when the dual-mode configuration is selected, the ACS unit 61 computes respective sums of the received branch metric value BMTn and the preceding path metric value PMTn sent by the PMM 62, compares two of the respective sums (BMTn+PMTn) at the outputs of the adders, and selects the smaller one of the two values (BMTn+PMTn) as the more probable value of the new path metrics (PMTm). The ACS unit 61 outputs the new path metric values PMTm (m=0, 1, 2, 3) to the PMM 62. At the same time, the ACS unit 61 transmits the path selection information DTm (m=0, 1, 2, 3) to the trailing-edge pass memory (PM) 63.

The above-described path metric computations are performed by the ACS units 57 and 61 in accordance with the computation formulas shown in FIG. 13A.

For example, the adder (Add0) of the ACS unit 57, shown in FIG. 12, is provided to compute the path metric value related to the path that has the transition from the state $S_L0$ to the state $S_L0$, and the adder (Add1) of the ACS unit 57 is provided to compute the path metric value related to the path that has the transition from the state $S_L1$ to the state $S_L0$. The comparator (Com.00) of the ACS unit 57 compares the path metric values at the outputs of these adders. The selector (Sel.00) of the ACS unit 57 selects the smaller one of the two values as the more probable value of the new path metrics (PML0), and outputs the new path metric value PML0 to the path metric memory PMM 58.

Figure 14:
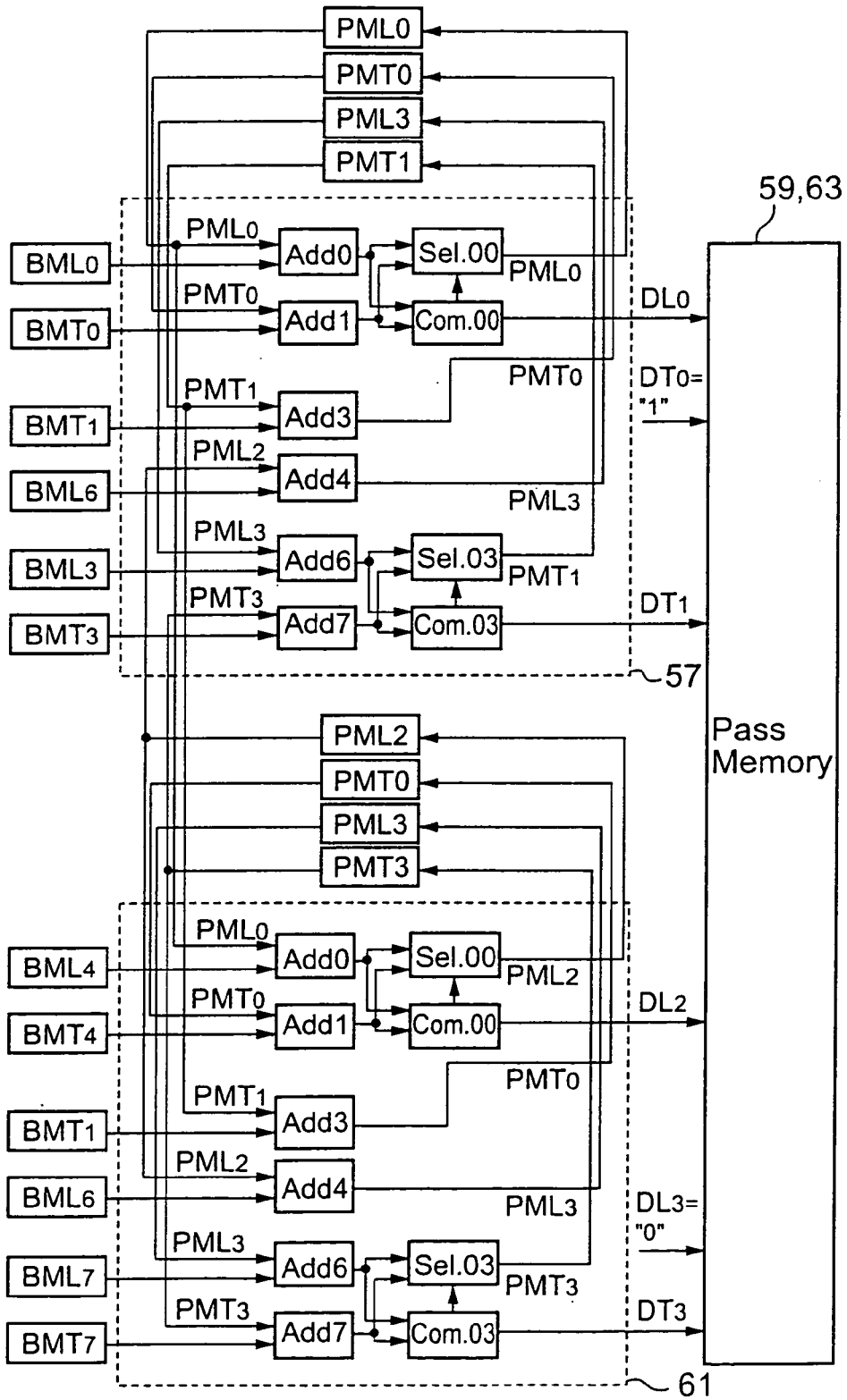
FIG. 14 is a block diagram of a configuration of the add-compare-select units of the data reproduction apparatus of the present embodiment when the single-mode configuration is selected.

FIG. 14 shows a configuration of the add-compare-select (ACS) units 57 and 61 of the data reproduction apparatus of the present embodiment when the single-mode configuration is selected.

As shown in FIG. 14, when the single-mode configuration is selected, the BM values BML0, BMT0, BMT1, BML6, BML3 and BMT3 are transmitted to the respective adders of the ACS unit 57 from the BM units 56 and 60. At the same time, the preceding PM values PML0, PMT0, PMT1, PML2, PML3 and PMT3 are transmitted to the respective adders of the ACS unit 57 from the PMMs 58 and 62. The above control of the destinations of the signal transmission is achieved by controlling the connection circuit 54 by the MPU 64. The ACS unit 57 computes respective sums of the received branch metric value BM and the preceding path metric value PM sent by the PMM 58 (or 62), compares two of the respective sums (BM+PM) at the outputs of the adders, and selects the smaller one of the two values (BM+PM) as the more probable value of the new path metrics (PM). In this manner, the ACS unit 57 outputs the new path metric values PML0, PMT0, PML3 and PMT1 to the PMM 58 (or 62). At the same time, the ACS unit 57 transmits the path selection information DL0, DT0 and DT1 to the pass memory 59 (or 63). In this case, the value of the DT0 is fixed to "1".

In addition, when the single-mode configuration is selected, the BM values BML4, BMT4, BMT1, BML6, BML7 and BMT7 are transmitted to the respective adders of the ACS unit 61 from the BM units 56 and 60. At the same time, the preceding PM values PML0, PMT0, PMT1, PML2, PML3 and PMT3 are transmitted to the respective adders of the ACS unit 61 from the PMMs 58 and 62. The control of the destinations of the signal transmission is achieved by controlling the connection circuit 54 by the MPU 64. The ACS unit 61 computes respective sums of the received branch metric value BM and the preceding path metric value PM sent by the PMM 58 (or 62), compares two of the respective sums (BM+PM) at the outputs of the adders, and selects the smaller one of the two values (BM+PM) as the more probable value of the new path metrics (PM). In this manner, the ACS unit 61 outputs the new path metric values PML2, PMT0, PML3 and PMT3 to the PMM 58 (or 62). At the same time, the ACS unit 61 transmits the path selection information DL2, DL3 and DT3 to the pass memory 59 (or 63). In this case, the value of the DL3 is fixed to "0".

The above-described path metric computations are performed by the ACS units 57 and 61 in accordance with the computation formulas shown in FIG. 13B.

It should be noted that the adders, the comparators and the selectors of the ACS units 57 and 61 can be shared for the dual-mode configuration and the single-mode configuration. Accordingly, each of the first and second Viterbi detectors 50 and 52 in the Viterbi detection unit 150 provides, when they are disconnected through the control of the connection circuit 54, the partial response signal with a small constraint length (the constraint length=3). When they are connected together through the control of the connection circuit 54, the Viterbi detection unit 150 provides the partial response signal with a large constraint length (the constraint length=4).

Figure 15:
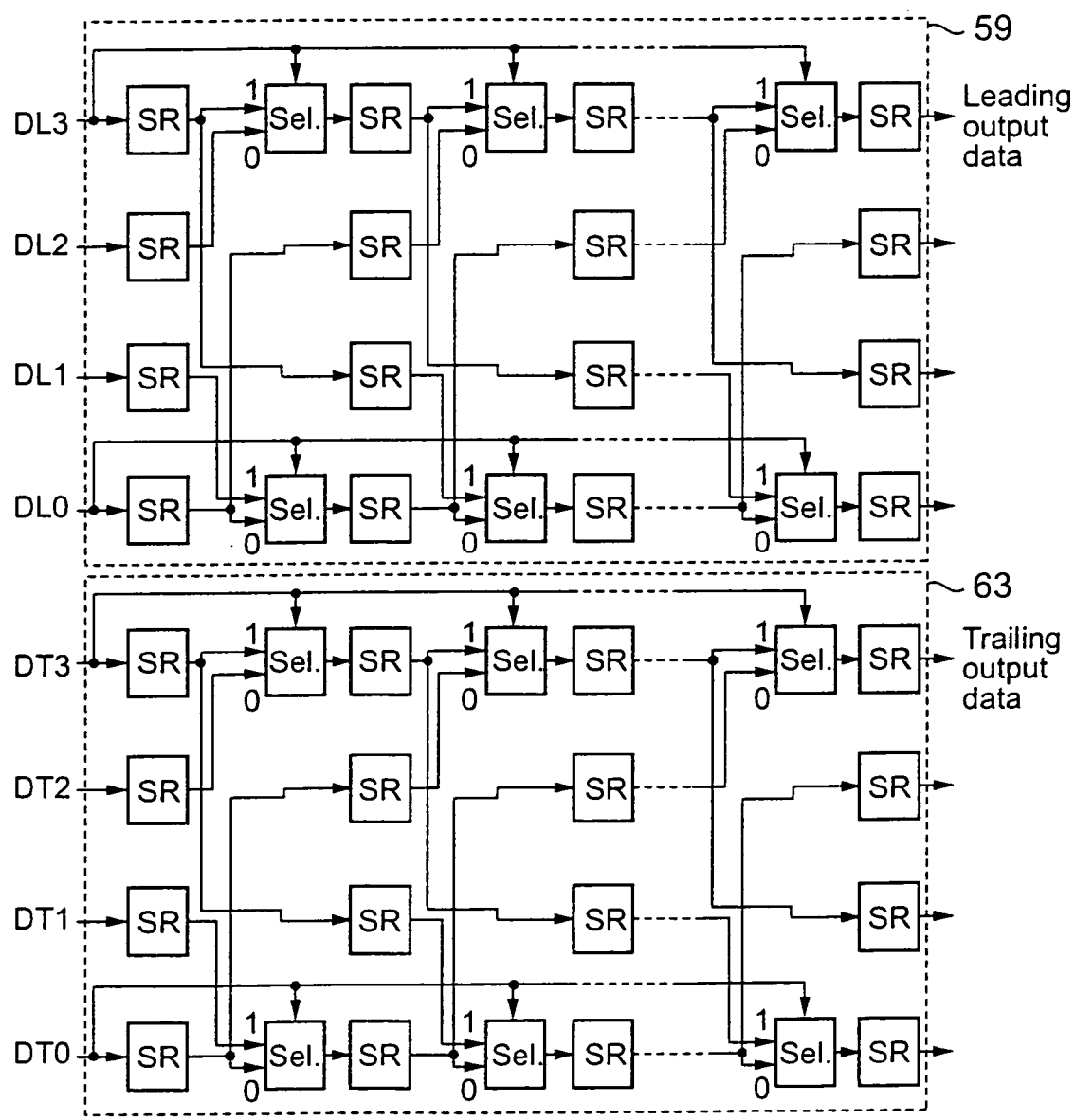
FIG. 15 is a block diagram of a configuration of pass memories of the data reproduction apparatus of the present embodiment when the dual-mode configuration is selected.

FIG. 15 shows a configuration of the pass memories 59 and 63 of the data reproduction apparatus of the present embodiment when the dual-mode configuration is selected.

As shown in FIG. 15, the pass memories 59 and 63 include a number of stages of shift registers (SR) and selectors (Sel). When the dual-mode configuration is selected, the path selection information DL0–DL3 is transmitted from the ACS unit 57 to the pass memory 59, and the path selection information DT0–DT3 is transmitted from the ACS unit 61 to the pass memory 63.

In the pass memory 59, the path selection information DL0–DL3 is sequentially supplied from one of the stages of the shift registers SR and the selectors Sel to the following stage of the shift registers SR and the selectors Sel in synchronization with the clock signal (or at the sampling instants). At the outputs of the final-stage shift registers SR, the data values DL0–DL3 are equal to each other, which are set in one of the states $SL0-SL^3$. For example, when the information DL0–DL3 is supplied to the second-stage shift registers SR from the first-stage shift registers SR and selectors Sel, the more probable state of the two possible states is selected. This process is repeated for the number of stages of the shift registers SR and selectors Sel.

Similarly, in the pass memory 63, the path selection information DT0–DT3 is sequentially supplied from one of the stages of the shift registers SR and the selectors Sel to the following stage of the shift registers SR and the selectors Sel in synchronization with the clock signal. At the outputs of the final-stage shift registers SR, the data values DT0–DT3 are equal to each other, which are set in one of the states $S_T0$–$S_T3$.

Figure 16:
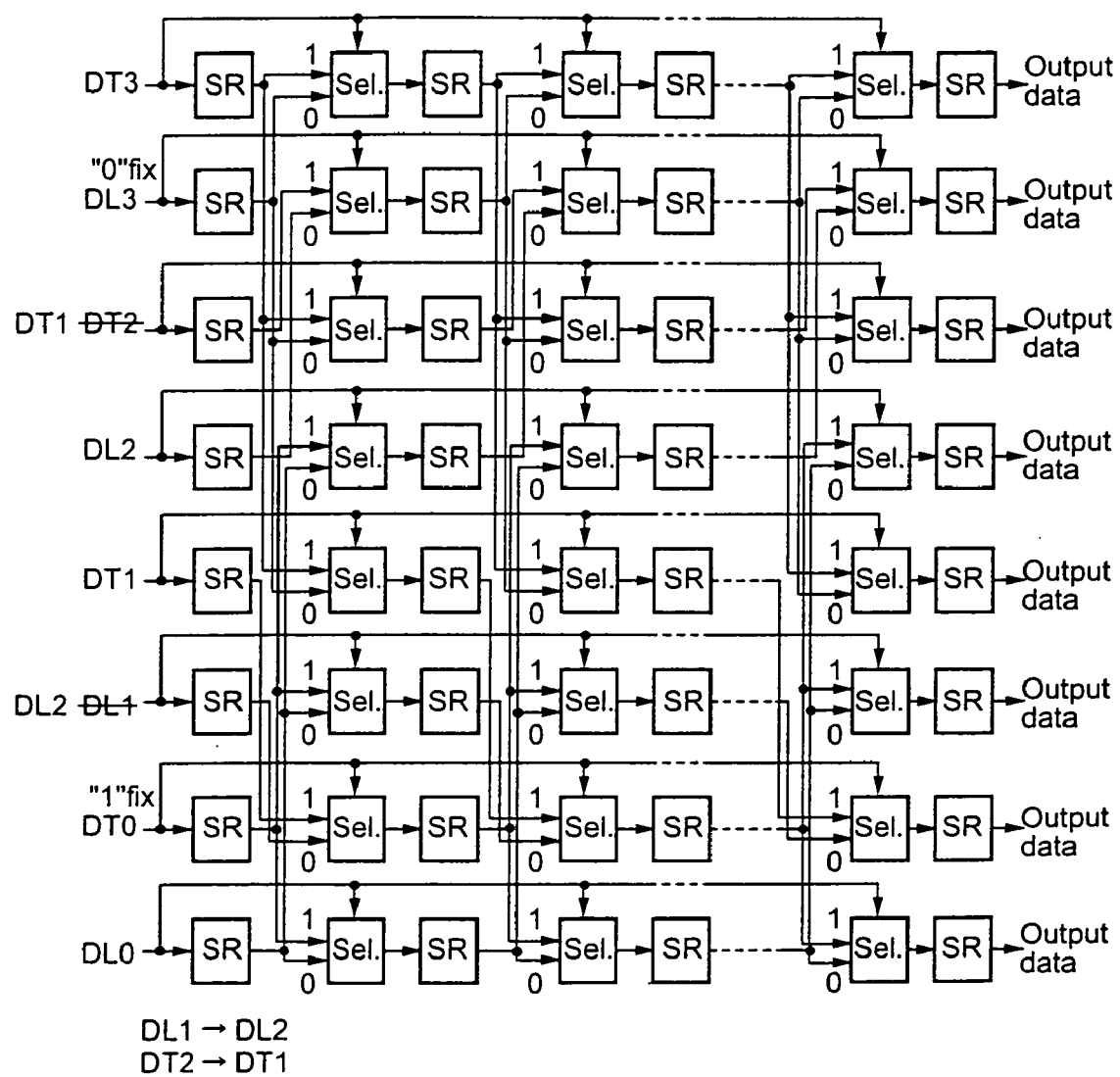
FIG. 16 is a block diagram of a configuration of the pass memories of the data reproduction apparatus of the present embodiment when the single-mode configuration is selected.

FIG. 16 shows a configuration of the pass memory of the data reproduction apparatus of the present embodiment when the single-mode configuration is selected.

As shown in FIG. 16, the pass memory of the present configuration includes a number of stages of shift registers (SR) and selectors (Sel). When the single-mode configuration is selected, the path selection information DL0, DL2, DL3 and the path selection information DT0, DT1, DT3 are transmitted from the ACS units 57 and 61 to the pass memory.

In the pass memory of this configuration, the path selection information DL0, DL2, DL3, DT0, DT1, DT3 is sequentially supplied from one of the stages of the shift registers SR and the selectors Sel to the following stage of the shift registers SR and the selectors Sel in synchronization with the clock signal. At the outputs of the final-stage shift registers SR, the data values are equal to each other, which are set in one of the states $S_L0$–$S_L3$ and $S_T0$–$S_T3$.

It should be noted that the shift registers and the selectors of the pass memories 59 and 63 can be shared for the dual-mode configuration and the single-mode configuration. Accordingly, each of the first and second Viterbi detectors 50 and 52 in the Viterbi detection unit 150 provides, when they are disconnected through the control of the connection circuit 54, the partial response signal with a small constraint length (the constraint length=3). When they are connected together through the control of the connection circuit 54, the Viterbi detection unit 150 provides the partial response signal with a large constraint length (the constraint length=4).

Figure 17:
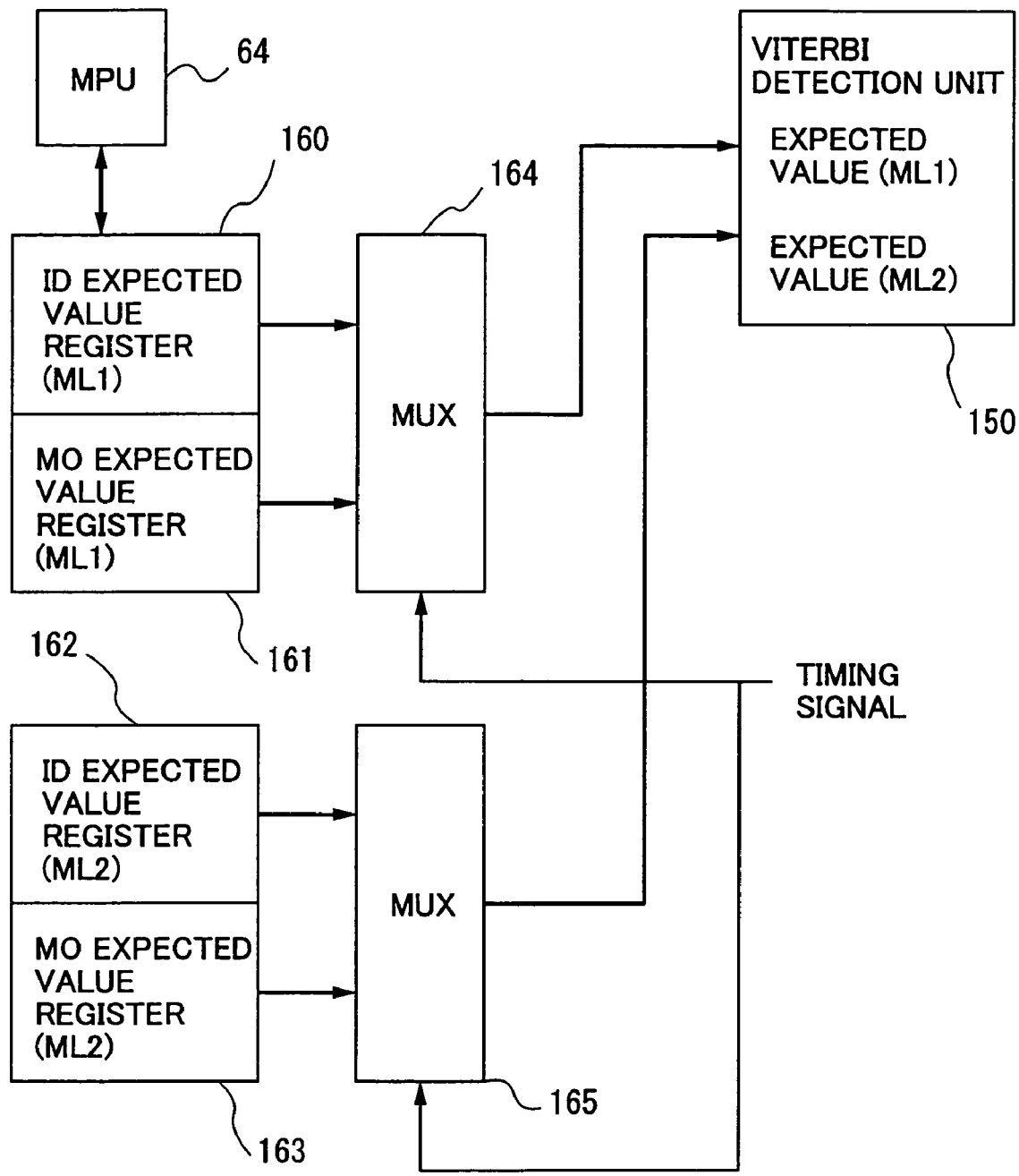
FIG. 17 is a diagram for explaining a setting of the expected values in the Viterbi detection unit of the data reproduction apparatus of the present embodiment.

FIG. 17 shows a setting of the expected values to the Viterbi detection unit 150 of the data reproduction apparatus of the present embodiment. FIG. 18 is a timing chart for explaining the setting of the expected values to the Viterbi detection unit 150 of the data reproduction apparatus of the present embodiment.

As shown in FIG. 17, the data reproduction apparatus of the present embodiment includes two registers 160 and 162 which store two ID-section expected values (ML1 and ML2) and two registers 161 and 163 which store two MO-section expected values (ML1 and ML2), because the Viterbi detection unit 150 includes the Viterbi detector 50 (ML1) and the Viterbi detector 52 (ML2).

The registers 160 and 161 are connected to a multiplexer (MUX) 164. The MUX 164 transmits a selected one of the ID-section expected value (ML1) and the MO-section expected value (ML1), supplied by the registers 160 and 161, to the Viterbi detection unit 150. The selective transmission of these expected values to the Viterbi detection unit 150 is performed by the MUX 164 in accordance with a timing signal indicated by (B) in FIG. 18.

Similarly, the registers 162 and 163 are connected to a multiplexer (MUX) 165. The MUX 165 transmits a selected one of the ID-section expected value (ML2) and the MO-section expected value (ML2), supplied by the registers 162 and 163, to the Viterbi detection unit 150. The selective transmission of these expected values to the Viterbi detection unit 150 is performed by the MUX 165 in accordance with the timing signal indicated by (B) in FIG. 18.

When reproducing data from the disk in the data format, including the ID section and the MO section as indicated by (A) in FIG. 18, the MPU 64 transmits the timing signal (indicated by (B) in FIG. 18) to each of the MUX 164 and the MUX 165. Therefore, it is possible that the MUX 164 transmit a selected one of the ID-section expected value (ML1) and the MO-section expected value (ML1) to the Viterbi detection unit 150 as indicated by (C) in FIG. 18. It is possible that the MUX 165 transmit a selected one of the ID-section expected value (ML2) and the MO-section expected value (ML2) to the Viterbi detection unit 150 as indicated by (D) in FIG. 18.

In the above-described embodiment, the PR (1, 3, 3, 1) is assumed as corresponding to the partial response signal with the constraint length=4. Alternatively, the PR (1, 2, 2, 1) or others may be used instead as the partial response signal with the constraint length=4.

In the above-described embodiment, one of connection and disconnection of the first and second Viterbi detectors 50 and 52 in the Viterbi detection unit 150 is selected in response to a timing signal that is indicative of whether the ID-section readout signal or the MO-section readout signal is obtained from the storage medium. Each of the first and second Viterbi detectors 50 and 52 in the Viterbi detection unit 150 provides, when they are disconnected, the partial response signal with a small constraint length (the first constraint length). When they are connected together, the Viterbi detection unit 150 provides the partial response signal with a large constraint length (the second constraint length). Therefore, it is possible for the data reproduction method and apparatus of the above embodiment to reliably reproduce the data from the storage medium with a relatively low-implementation cost. The data reproduction method and apparatus of the above embodiment are effective in providing good accuracy of the data reproduction from the optical storage media without increasing the implementation cost.

Further, the data reproduction method and apparatus of the present invention are not limited to the above embodiment but applicable to the data reproduction parts of other disk drives.

For example, the data reproduction method and apparatus of the present invention are also applicable to a disk drive of the type that is configured to provide the data reproduction by using the same beam spot to read each of optical storage media of two types (e.g., CD-RAM and DVD-RAM) having different recording densities. In the data reproduction of such disk drive, the readout signal from one type of the storage medium and the readout signal from the other type of the storage medium derive the partial response (PR) signals having different constraint lengths because of the different recording densities of the media.

Figure 19A:
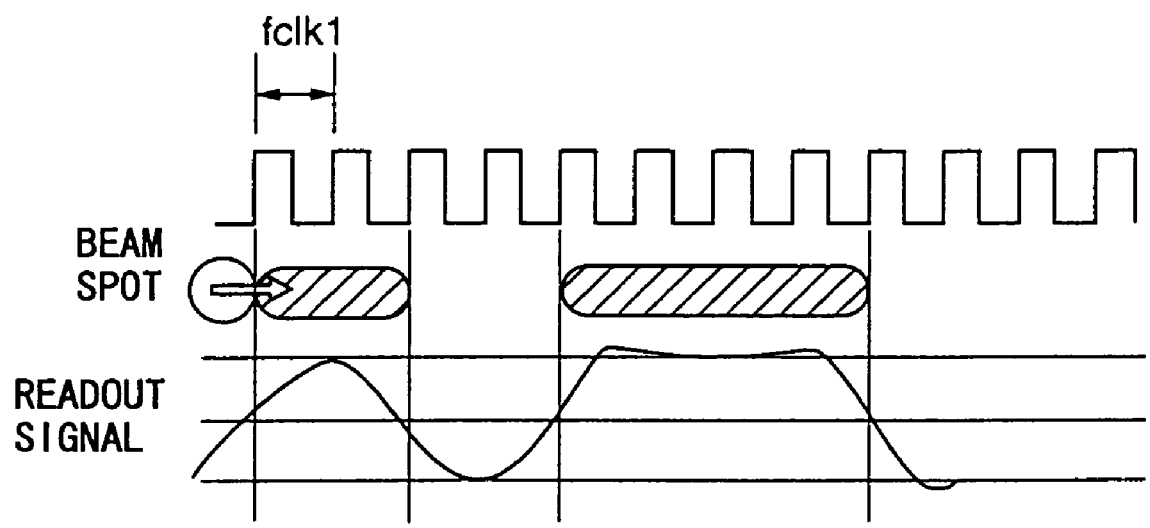
FIG. 19A and FIG. 19B are diagrams for explaining the waveforms of readout signals obtained from optical disks of different types having different recording densities.
Figure 19B:
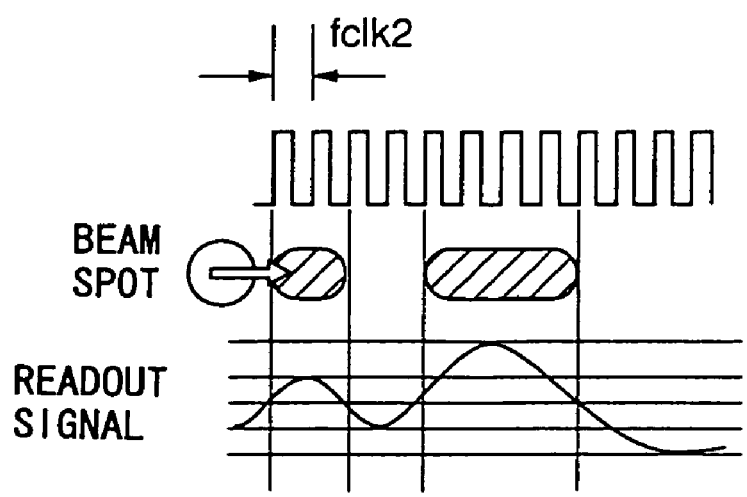

FIG. 19A shows the waveform of a readout signal from a first-type optical disk having a low recording density, and FIG. 19B shows the waveform of a readout signal from a second-type optical disk having a high recording density. In the first-type optical disk, data is recorded with a low-frequency reference clock "fclk1", and the length of a mark per bit is relatively large. In the second-type optical disk, data is recorded with a high-frequency reference clock "fclk2", and the length of a mark per bit is relatively small. As is apparent from the waveforms of FIG. 19A and FIG. 19B, the readout signal from the first-type optical disk and the readout signal from the second-type optical disk derive the partial response signals that are in different conditions.

When the code sequences that are recorded onto the media are different from each other, the necessary bands are varied and the partial response signals for the readout signals have different constraint lengths.

Further, there is the data reproduction part of a certain disk drive wherein an ID-section readout signal is produced from the storage medium by using the beam spot of an optical pickup, while a data-section readout signal is produced by using a magneto-resistive (MR) head. Conversely, the ID-section readout signal may be produced by the MR head and the data-section readout signal may be produced by using the pickup. In the data reproduction of the above disk drive, the partial response signals, which are respectively derived from the optical readout signal and the magneto-electrical readout signal, have different constraint lengths. It is conceivable that the data reproduction method and apparatus of the present invention can be applied to disk drives of the above type.

The present invention is not limited to the above-described embodiments, and variations and modifications may be made without departing from the scope of the present invention.

Further, the present invention is based on Japanese priority application No.2000-069012, filed on Mar. 13, 2000, the entire contents of which are hereby incorporated by reference.

What is claimed is:

1. A data reproduction apparatus which reproduces data from recorded data, comprising:
    a Viterbi detection unit having a plurality of detectors each providing a first partial response signal with a first constraint length alone;
    a sample transmission unit transmitting a plurality of sequences of samples to the plurality of detectors respectively;
    an expected value transmission unit transmitting a plurality of expected values to the plurality of detectors respectively;
    a connection unit connecting the plurality of detectors together to cause the Viterbi detection unit to provide a second partial response signal with a second constraint length different from the first constraint length; and
    a connection control unit controlling connection and disconnection of the plurality of detectors by the connection unit in response to a constraint length of the recorded data.

2. The data reproduction apparatus of claim 1, wherein the second constraint length is larger than the first constraint length.

3. The data reproduction apparatus of claim 1, further comprising:
    a first register storing a first expected value corresponding to the first partial response signal with the first constraint length; and
    a second register storing a second expected value corresponding to the second partial response signal with the second constraint length.

4. The data reproduction apparatus of claim 3, wherein one of the first expected value output from the first register and the second expected value output from the second register is selectively set to the Viterbi detection unit in accordance with the timing signal.

5. The data reproduction apparatus of claim 1, wherein the plurality of detectors include branch metric computation units, add-compare-select units, path metric memories, and pass memories, and wherein the connection unit selects one of connection and disconnection of each of the branch metric computation units, the add-compare-select units, the path metric memories and the pass memories in response to the timing signal.

6. The data reproduction apparatus of claim 5, wherein, when the connection of the plurality of detectors is selected, the connection unit changes internal connections of the pass memories from internal connections of the pass memories when the disconnection of the plurality of detectors is selected.

7. The data reproduction apparatus of claim 5, wherein, when the connection of the plurality of detectors is selected, the connection unit changes the individual samples that are supplied to the plurality of detectors, from the individual samples supplied to the plurality of detectors when the disconnection of the plurality of detectors is selected.

8. The data reproduction apparatus of claim 1, further comprising a control unit that controls the connection unit by supplying the timing signal to the connection unit.

9. A data reproduction method which reproduces data from recorded data, comprising the steps of:
    providing a Viterbi detection unit having a plurality of detectors each providing a first partial response signal with a first constraint length alone;
    transmitting a plurality of sequences of samples to the plurality of detectors respectively;
    transmitting a plurality of expected values to the plurality of detectors respectively;
    connecting the plurality of detectors together to cause the Viterbi detection unit to provide a second partial response signal with a second constraint length different from the first constraint length; and
    controlling connection and disconnection of the plurality of detectors in response to a constraint length of the recorded data.

10. The data reproduction method of claim 9, wherein the plurality of detectors include branch metric computation units, add-compare-select units, path metric memories, and pass memories, and wherein, in said selecting step, one of connection and disconnection of each of the branch metric computation units, the add-compare-select units, the path metric memories and the pass memories is selected in response to the timing signal.

* * * * *